US008230343B2

(12) United States Patent
Logan et al.

(10) Patent No.: US 8,230,343 B2
(45) Date of Patent: Jul. 24, 2012

(54) AUDIO AND VIDEO PROGRAM RECORDING, EDITING AND PLAYBACK SYSTEMS USING METADATA

(75) Inventors: James D. Logan, Windham, NH (US); Scott A. Durgin, North Andover, MA (US); Brian D Doe, Windham, NH (US); Vincent E. Colella, Wilmington, MA (US); Jeffrey M. Santos, Newburyport, MA (US); Michael G. Palone, Acton, MA (US); Stephen Boone, Windham, MA (US); McFarland Hale, North Chelmsford, MA (US); Paul M. Mansfield, Burlington, MA (US); Gregory J. Read, Newbury, MA (US)

(73) Assignee: Digitalsmiths, Inc., Durham, NC (US)

( * ) Notice: Subject to any disclaimer, the term of this patent is extended or adjusted under 35 U.S.C. 154(b) by 621 days.

(21) Appl. No.: 11/894,565

(22) Filed: Aug. 20, 2007

(65) Prior Publication Data

US 2008/0092168 A1      Apr. 17, 2008

Related U.S. Application Data

(63) Continuation of application No. 10/165,587, filed on Jun. 8, 2002, now abandoned, which is a continuation-in-part of application No. 10/060,001, filed on Jan. 29, 2002, which is a continuation-in-part of application No. 09/536,969, filed on Mar. 28, 2000.

(60) Provisional application No. 60/297,204, filed on Jun. 8, 2001, provisional application No. 60/352,788, filed on Nov. 28, 2001, provisional application No. 60/336,602, filed on Dec. 3, 2001, provisional application No. 60/346,418, filed on Dec. 29, 2001, provisional application No. 60/304,570, filed on Jul. 11, 2001, provisional application No. 60/126,758, filed on Mar. 29, 1999.

(51) Int. Cl.
*G06F 3/00* (2006.01)
*H04N 5/76* (2006.01)

(52) U.S. Cl. ........ 715/723; 386/291; 386/297; 715/700; 715/716; 725/39; 725/40

(58) Field of Classification Search ............... 386/46, 386/55, 69, 83, 124–126, 239, 243, 291, 386/297; 715/700, 716, 723; 707/1; 725/39, 725/46, 48, 51, 105, 114, 119, 133, 135–141
See application file for complete search history.

(56) References Cited

U.S. PATENT DOCUMENTS 4,528,589 A    7/1985  Block et al.
(Continued)

FOREIGN PATENT DOCUMENTS

EP         0424648        5/1991
(Continued)

OTHER PUBLICATIONS

Non Final Office Action dated Apr. 4, 2008, U.S. Appl. No. 10/767,926.
(Continued)

*Primary Examiner* — Thai Tran
*Assistant Examiner* — Mishawn Dunn
(74) *Attorney, Agent, or Firm* — John L. Sotomayor

(57) ABSTRACT

A system for utilizing metadata created either at a central location for shared use by connected users, or at each individual user's location, to enhance user's enjoyment of available broadcast programming content. A variety of mechanisms are employed for automatically and manually identifying and designating programming segments, associating descriptive metadata which the identified segments, distributing the metadata for use at client locations, and using the supplied metadata to selectively record and playback desired programming.

17 Claims, 4 Drawing Sheets

U.S. PATENT DOCUMENTS

| | | | |
|---|---|---|---|
| 4,702,915 A | 10/1987 | Keri et al. | |
| 5,057,932 A | 10/1991 | Lang | |
| 5,109,482 A | 4/1992 | Bohrman | |
| 5,119,507 A | 6/1992 | Mankovitz | |
| 5,353,121 A | 10/1994 | Young et al. | |
| 5,436,653 A | 7/1995 | Ellis et al. | |
| 5,467,288 A * | 11/1995 | Fasciano et al. | 715/716 |
| 5,485,219 A | 1/1996 | Woo et al. | |
| 5,534,911 A | 7/1996 | Levitan | |
| 5,557,338 A | 9/1996 | Maze | |
| 5,572,442 A | 11/1996 | Schulhof | |
| 5,574,845 A | 11/1996 | Benson | |
| 5,610,653 A | 3/1997 | Abecassis | |
| 5,634,849 A | 6/1997 | Abecassis | |
| 5,659,877 A | 8/1997 | Enomoto | |
| 5,661,787 A | 8/1997 | Pocock | |
| 5,675,695 A | 10/1997 | Hirayama et al. | |
| 5,688,528 A | 11/1997 | Carlsson et al. | |
| 5,694,163 A | 12/1997 | Harrison | |
| 5,710,815 A | 1/1998 | Ming et al. | |
| 5,732,216 A | 3/1998 | Logan et al. | |
| 5,732,324 A | 3/1998 | Rieger, III | |
| 5,736,977 A | 4/1998 | Hughes | |
| 5,754,938 A | 5/1998 | Herz et al. | |
| 5,781,228 A | 7/1998 | Sposato | |
| 5,801,685 A * | 9/1998 | Miller et al. | 715/202 |
| 5,810,600 A | 9/1998 | Okada | |
| 5,818,439 A | 10/1998 | Nagasaka et al. | |
| 5,838,917 A | 11/1998 | Paolini | |
| 5,844,620 A | 12/1998 | Coleman et al. | |
| 5,872,588 A | 2/1999 | Aras et al. | |
| 5,884,056 A | 3/1999 | Steele | |
| 5,885,582 A | 3/1999 | O'Reilly | |
| 5,892,536 A | 4/1999 | Logan et al. | |
| 5,937,331 A | 8/1999 | Kalluri et al. | |
| 5,949,876 A | 9/1999 | Ginter et al. | |
| 5,970,504 A | 10/1999 | Abe et al. | |
| 5,974,218 A | 10/1999 | Nagasaka et al. | |
| 5,986,692 A | 11/1999 | Logan et al. | |
| 6,005,603 A | 12/1999 | Flavin | |
| 6,025,868 A | 2/2000 | Russo | |
| 6,026,376 A | 2/2000 | Kenney | |
| 6,026,446 A | 2/2000 | Ostrover | |
| 6,081,830 A | 6/2000 | Schindler | |
| 6,088,455 A | 7/2000 | Logan et al. | |
| 6,118,450 A | 9/2000 | Proehl et al. | |
| 6,122,378 A | 9/2000 | Yoshiura | |
| 6,144,375 A | 11/2000 | Jain et al. | |
| 6,154,771 A | 11/2000 | Rangan et al. | |
| 6,199,076 B1 | 3/2001 | Logan | |
| 6,226,030 B1 | 5/2001 | Harvey et al. | |
| 6,233,389 B1 | 5/2001 | Barton et al. | |
| 6,236,395 B1 | 5/2001 | Sezan | |
| 6,243,725 B1 * | 6/2001 | Hempleman et al. | 715/210 |
| 6,248,946 B1 | 6/2001 | Dwek | |
| 6,262,724 B1 | 7/2001 | Crow et al. | |
| 6,289,165 B1 | 9/2001 | Abecassis | |
| 6,357,042 B2 | 3/2002 | Srinivasan et al. | |
| 6,366,296 B1 | 4/2002 | Boreczky et al. | |
| 6,388,958 B1 | 5/2002 | Yankowski | |
| 6,389,467 B1 | 5/2002 | Eyal | |
| 6,404,978 B1 * | 6/2002 | Abe | 386/281 |
| 6,484,156 B1 | 11/2002 | Gupta | |
| 6,499,027 B1 | 12/2002 | Weinberger | |
| 6,505,160 B1 | 1/2003 | Levy | |
| 6,519,693 B1 | 2/2003 | Debey et al. | |
| 6,526,411 B1 | 2/2003 | Ward | |
| 6,560,798 B2 | 5/2003 | Welling et al. | |
| 6,563,515 B1 | 5/2003 | Reynolds et al. | |
| 6,567,980 B1 | 5/2003 | Jain | |
| 6,581,207 B1 | 6/2003 | Sumita et al. | |
| 6,584,463 B2 | 6/2003 | Morita et al. | |
| 6,628,303 B1 * | 9/2003 | Foreman et al. | 715/723 |
| 6,637,029 B1 | 10/2003 | Maissel et al. | |
| 6,686,440 B2 | 2/2004 | Swift | |
| 6,738,978 B1 | 5/2004 | Hendricks et al. | |
| 6,754,904 B1 | 6/2004 | Cooper et al. | |
| 6,763,345 B1 | 7/2004 | Hempleman et al. | |
| 6,813,775 B1 | 11/2004 | Finseth et al. | |
| 6,839,880 B1 | 1/2005 | Morse et al. | |
| 6,961,954 B1 | 11/2005 | Maybury et al. | |
| 6,990,676 B1 | 1/2006 | Proehl et al. | |
| 7,055,166 B1 | 5/2006 | Logan et al. | |
| 7,284,032 B2 | 10/2007 | Weber | |
| 7,313,808 B1 | 12/2007 | Gupta et al. | |
| 7,320,137 B1 | 1/2008 | Novak | |
| 7,496,669 B2 | 2/2009 | Hirayama | |
| 7,548,565 B2 | 6/2009 | Sull | |
| 2001/0018693 A1 | 8/2001 | Jain et al. | |
| 2001/0049826 A1 | 12/2001 | Wilf | |
| 2002/0026496 A1 | 2/2002 | Boyer et al. | |
| 2002/0034373 A1 | 3/2002 | Morita | |
| 2002/0034980 A1 | 3/2002 | Lemmons et al. | |
| 2002/0065678 A1 | 5/2002 | Peliotis | |
| 2002/0069218 A1 * | 6/2002 | Sull et al. | 707/501.1 |
| 2002/0106191 A1 | 8/2002 | Betz et al. | |
| 2002/0109710 A1 * | 8/2002 | Holtz et al. | 345/723 |
| 2002/0120925 A1 | 8/2002 | Logan | |
| 2002/0157099 A1 | 10/2002 | Schrader et al. | |
| 2002/0157101 A1 | 10/2002 | Schrader et al. | |
| 2002/0166123 A1 | 11/2002 | Schrader et al. | |
| 2003/0054885 A1 | 3/2003 | Pinto et al. | |
| 2003/0093790 A1 | 5/2003 | Logan et al. | |
| 2003/0095790 A1 | 5/2003 | Joshi | |
| 2003/0100965 A1 | 5/2003 | Sirick et al. | |
| 2003/0110507 A1 | 6/2003 | DiMitrova et al. | |
| 2003/0177503 A1 * | 9/2003 | Sull et al. | 725/112 |
| 2003/0182254 A1 | 9/2003 | Plastina et al. | |
| 2003/0194211 A1 * | 10/2003 | Abecassis | 386/69 |
| 2003/0208473 A1 | 11/2003 | Lennon | |
| 2004/0017389 A1 | 1/2004 | Pan et al. | |
| 2004/0078808 A1 | 4/2004 | Herledan | |
| 2004/0111465 A1 | 6/2004 | Chuang et al. | |
| 2004/0117831 A1 | 6/2004 | Ellis et al. | |
| 2004/0125124 A1 | 7/2004 | Kim et al. | |
| 2004/0138948 A1 | 7/2004 | Loomis | |
| 2004/0249726 A1 | 12/2004 | Linehan | |
| 2005/0022890 A1 | 2/2005 | Demchick | |
| 2005/0076362 A1 | 4/2005 | Dukes et al. | |
| 2005/0144641 A1 | 6/2005 | Lewis | |
| 2005/0149964 A1 | 7/2005 | Thomas et al. | |
| 2005/0183119 A1 | 8/2005 | Hofrichter et al. | |
| 2005/0204385 A1 * | 9/2005 | Sull et al. | 725/45 |
| 2005/0239549 A1 | 10/2005 | Salvatore et al. | |
| 2005/0262542 A1 | 11/2005 | DeWeese et al. | |
| 2005/0283810 A1 | 12/2005 | Ellis et al. | |
| 2006/0031882 A1 | 2/2006 | Swix et al. | |
| 2006/0064716 A1 | 3/2006 | Sull et al. | |
| 2006/0129458 A1 | 6/2006 | Maggio | |
| 2006/0183547 A1 | 8/2006 | McMonigle | |
| 2006/0184989 A1 | 8/2006 | Slothouber | |
| 2006/0190966 A1 | 8/2006 | McKissick et al. | |
| 2007/0166001 A1 | 7/2007 | Barton | |
| 2008/0154628 A1 | 6/2008 | Ogawa et al. | |

FOREIGN PATENT DOCUMENTS

| | | |
|---|---|---|
| EP | 0898278 | 2/1999 |
| EP | 1079623 | 2/2001 |
| GB | 2304489 | 3/1997 |
| WO | WO-9627840 | 9/1996 |
| WO | WO 9627840 | 9/1996 |
| WO | WO 9637965 | 11/1996 |
| WO | WO-9637965 | 11/1996 |
| WO | WO 9831113 | 7/1998 |
| WO | WO-9831113 | 7/1998 |
| WO | WO 0115449 | 3/2001 |
| WO | WO-0115449 | 3/2001 |
| WO | WO 2004/043029 | 5/2004 |
| WO | WO-2004/043029 | 5/2004 |

OTHER PUBLICATIONS

Non Final Office Action dated Feb. 7, 2008, U.S. Appl. No. 10/767,946.

International Preliminary Report on Patentability, Serial No. PCT/US2006/035143.

* cited by examiner

AUDIO AND VIDEO PROGRAM RECORDING, EDITING AND PLAYBACK SYSTEMS USING METADATA

CROSS REFERENCE TO RELATED APPLICATIONS

This application is a continuation of U.S. application Ser. No. 10/165,587 filed Jun. 8, 2002 now abandoned.

U.S. application Ser. No. 10/165,587 claims the benefit of U.S. Provisional Patent Application No. 60/297,204 filed Jun. 8, 2001, U.S. Provisional Patent Application No. 60/352,788 filed Nov. 28, 2001, U.S. Provisional Patent Application No. 60/336,602 filed Dec. 3, 2001, and U.S. Provisional Patent Application No. 60/346,418 filed Dec. 29, 2001.

U.S. application Ser. No. 10/165,587 is also a continuation in part of U.S. application Ser. No. 10/060,001 filed Jan. 29, 2002, which claims the benefit of U.S. Provisional Patent Application No. 60/304,570 filed Jul. 11, 2001, U.S. Provisional Patent Application No. 60/336,602 filed Dec. 3, 2001, and U.S. Provisional Patent Application No. 60/346,418 filed Dec. 29, 2001. U.S. application Ser. No. 10/060,001 is a continuation in part of U.S. application Ser. No. 09/536,969 filed Mar. 28, 2000, which claims the benefit of U.S. Provisional Patent Application No. 60/126,758 filed Mar. 29, 1999.

The disclosure of each of the foregoing applications is incorporated herein by reference.

REFERENCE TO COMPUTER PROGRAM LISTING APPENDIX

A computer program listing appendix is stored on each of two duplicate compact disks which accompany this specification. Each disk contains computer program listings that illustrate implementations of the invention. The listings are recorded as ASCII text in IBM PC/MS DOS compatible files which have the names, sizes (in bytes) and creation dates listed below:

| Size (bytes) | Date created | | Filename |
|---|---|---|---|
| 3,123 | 05-21-01 | 12:08p | ToolBarDlg.h |
| 1,141 | 05-21-01 | 12:08p | CAnimate.h |
| 65,419 | 06-05-01 | 11:13p | CNPDlg.cpp |
| 5,228 | 06-04-01 | 10:20a | CNPDlg.h |
| 33,964 | 06-04-01 | 10:16a | ConceptDlg.cpp |
| 6,337 | 06-01-01 | 10:30a | ConceptDlg.h |
| 19,459 | 06-04-01 | 5:37p | CPLDlg.cpp |
| 3,553 | 05-23-01 | 4:24a | CPLDlg.h |
| 3,758 | 05-21-01 | 12:08p | cpp |
| 26,672 | 06-04-01 | 5:39p | CSegmentDriver.cpp |
| 6,317 | 05-29-01 | 2:04p | CSegmentDriver.h |
| 29,715 | 05-21-01 | 12:08p | dxmplayer.cpp |
| 7,527 | 05-21-01 | 12:08p | dxmplayer.h |
| 1,202 | 05-21-01 | 12:08p | DXMPLayerConstants.h |
| 5,258 | 05-21-01 | 12:08p | DXMPlayerEventSink.cpp |
| 2,239 | 05-21-01 | 12:08p | DXMPlayerEventSink.h |
| 7,753 | 06-01-01 | 10:28a | GClient.clw |
| 3,259 | 05-24-01 | 12:14p | GClient.cpp |
| 5,771 | 05-21-01 | 12:08p | GClient.dep |
| 13,602 | 06-04-01 | 10:21a | GClient.dsp |
| 537 | 05-21-01 | 12:08p | GClient.dsw |
| 10,333 | 06-05-01 | 1:09p | GClient.h |
| 16,693 | 05-21-01 | 12:08p | GClient.mak |
| 541,696 | 06-01-01 | 10:24a | GClient.ncb |
| 79,872 | 06-01-01 | 10:23a | GClient.opt |
| 1,704 | 06-04-01 | 10:26a | GClient.plg |
| 35,194 | 06-05-01 | 10:46p | GClient.rc |
| 4,127 | 05-21-01 | 12:08p | GClientDlg.cpp |

-continued

| Size (bytes) | Date created | | Filename |
|---|---|---|---|
| 1,353 | 05-21-01 | 12:08p | GClientDlg.h |
| 12,074 | 05-21-01 | 12:08p | gmanager.cpp |
| 3,404 | 05-21-01 | 12:08p | gmanager.h |
| 7,706 | 05-23-01 | 4:19a | IMediaPlayer.h |
| 20,350 | 06-04-01 | 3:56p | InfoDlg.cpp |
| 3,187 | 05-24-01 | 12:17p | InfoDlg.h |
| 8,988 | 05-21-01 | 12:08p | ISegmentDriver.h |
| 3,020 | 05-28-01 | 6:52a | ISegmentListCtrl.h |
| 10,152 | 05-23-01 | 4:22a | MediaPlayer.cpp |
| 1,894 | 05-23-01 | 4:19a | MediaPlayer.h |
| 5,982 | 06-04-01 | 10:13a | metadata.cpp |
| 33,088 | 06-05-01 | 1:13p | MetaDataDlg.cpp |
| 3,754 | 06-01-01 | 10:21a | MetaDataDlg.h |
| 13,369 | 06-05-01 | 1:31a | NotAuthored.cpp |
| 3,292 | 05-24-01 | 6:31a | NotAuthored.h |
| 11,161 | 06-05-01 | 3:53p | playlist.cpp |
| 5,676 | 05-24-01 | 4:20a | ReadMe.txt |
| 13,465 | 06-04-01 | 10:19a | Resource.h |
| 3,001 | 05-21-01 | 12:08p | resource.h.ejb |
| 2,622 | 05-21-01 | 12:08p | resource.h.old |
| 6,716 | 06-04-01 | 3:53p | segment.cpp |
| 3,608 | 05-31-01 | 1:54p | segment.h |
| 1,227 | 05-21-01 | 12:08p | segmentList.cpp |
| 1,598 | 05-21-01 | 12:08p | segmentList.h |
| 42,155 | 06-05-01 | 1:13p | SegmentListCtrl.cpp |
| 8,025 | 05-28-01 | 6:52a | SegmentListCtrl.h |
| 21,934 | 05-21-01 | 12:08p | segmentlistctrl.sav |
| 19,437 | 06-05-01 | 10:02a | SettingsDlg.cpp |
| 3,086 | 05-28-01 | 6:56a | SettingsDlg.h |
| 209 | 05-21-01 | 12:08p | StdAfx.cpp |
| 1,195 | 05-21-01 | 12:08p | StdAfx.h |
| 8,653 | 06-05-01 | 1:33a | ThankYouDlg.cpp |
| 2,288 | 06-04-01 | 10:08a | ThankYouDlg.h |
| 11,679 | 06-04-01 | 10:25a | ToolBarDlg.cpp |
| 662 | 05-21-01 | 12:07p | CAnimate.cpp |
| 5,993 | 04-19-01 | 3:39p | TestAccess.java |
| 3,060 | 03-27-01 | 5:16p | ER.TVP |
| 2,043 | 04-19-01 | 3:55p | GDBPool.java.txt |
| 7,307 | 04-23-01 | 12:16p | GGUPIServlet.java |
| 1,472 | 04-27-01 | 5:23p | GPlayListSet.java.txt |
| 1,189 | 04-27-01 | 5:26p | GPlayListSetFromCache.java.txt |
| 1,207 | 04-27-01 | 5:28p | GPlayListSetFromDatabase.java.txt |
| 1,187 | 04-27-01 | 5:27p | GPlayListSetFromFile.java.txt |
| 7,337 | 04-23-01 | 12:08p | GPostServlet.java |
| 3,592 | 04-27-01 | 5:16p | GQuery.java.txt |
| 7,308 | 04-23-01 | 12:16p | GQueryServlet.java |
| 1,643 | 04-19-01 | 5:05p | GService.java.txt |
| 825 | 04-12-01 | 12:24a | GTest.java |
| 1,132 | 04-20-01 | 2:00p | JDBCConfig.properties |
| 5,604 | 04-23-01 | 11:51a | SnoopServlet.java |
| 5,874 | 04-19-01 | 12:10a | Copy of TestAccess.java.txt |
| 935 | 05-29-01 | 1:01p | tvp.php |
| 358 | 05-25-01 | 7:30a | frames.html |
| 12,051 | 06-05-01 | 3:25p | gspot.php |
| 919 | 05-22-01 | 6:37a | movie2.php |
| 636 | 05-22-01 | 6:37a | player.js |
| 4,546 | 06-01-01 | 4:23p | sreplace.php |
| 983 | 05-31-01 | 6:04a | file. ph |

Copyright Statement

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to audio and video program reception, storage, editing, recording and playback systems and more particularly to methods and apparatus for distributing, recording, organizing and editing metadata that is used to selectively distribute, record, organize, edit and play program content.

BACKGROUND OF THE INVENTION

Historically, the viewing experience of TV has been governed by the content and programming of the service providers, broadcasters and networks who decide when programs will be available and their duration. While lifestyles have become more complex and the content available to the viewer has increased, it has become more desirable to allow viewers to control this form of entertainment on their own terms. While video cassette recorders (VCRs) allow viewers to capture content for future playback, the VCR has been plagued with limitations inherent in the analog tape media and the difficulty viewers commonly experience in programming these devices to record selected future programs.

The recent advent of digital video recorders (DVRs), coupled with more intuitive electronic program guides (EPGs) used in popular DVRs, have provided new and simplified recording options for viewers. In addition, as a useful byproduct of digital storage, DVRs provide the ability to pause, replay and fast-forward the playback of time-shifted programming. However, as the number of available channels and the volume and diversity of available content increases, currently available DVRs and program guides will not provide the needed ability to playback and scan volumes of stored video with simple controls and with minimal knowledge of the available content. Viewers will need "more information about the content to help them navigate between programs and within a particular program.

SUMMARY OF THE INVENTION

In a principle aspect, the present invention takes the form of methods and apparatus for selectively reproducing recorded video program segments retrieved from a mass storage device under the control of playlist metadata which identifies a selected set of the stored segments ant the ordered sequence in which those segments are to be reproduced in the absence of an intervening control command from the viewer. The playlist metadata includes a text description of each segment in the sequence. In response to a request from the viewer, an segment guide listing containing the text description of each segment is displayed with the text description of the currently playing segment being visually identified on the list. Control means operated by the viewer permit the viewer to choose a different segment to be viewed by selecting the text description of that segment on the displayed index listing.

In accordance with a further feature of the invention, attribute data is associated with at least selected ones of the stored video program segments and means are provided for selecting and sorting stored segments based on the attribute data.

DETAILED DESCRIPTION

Background

Figure 1:
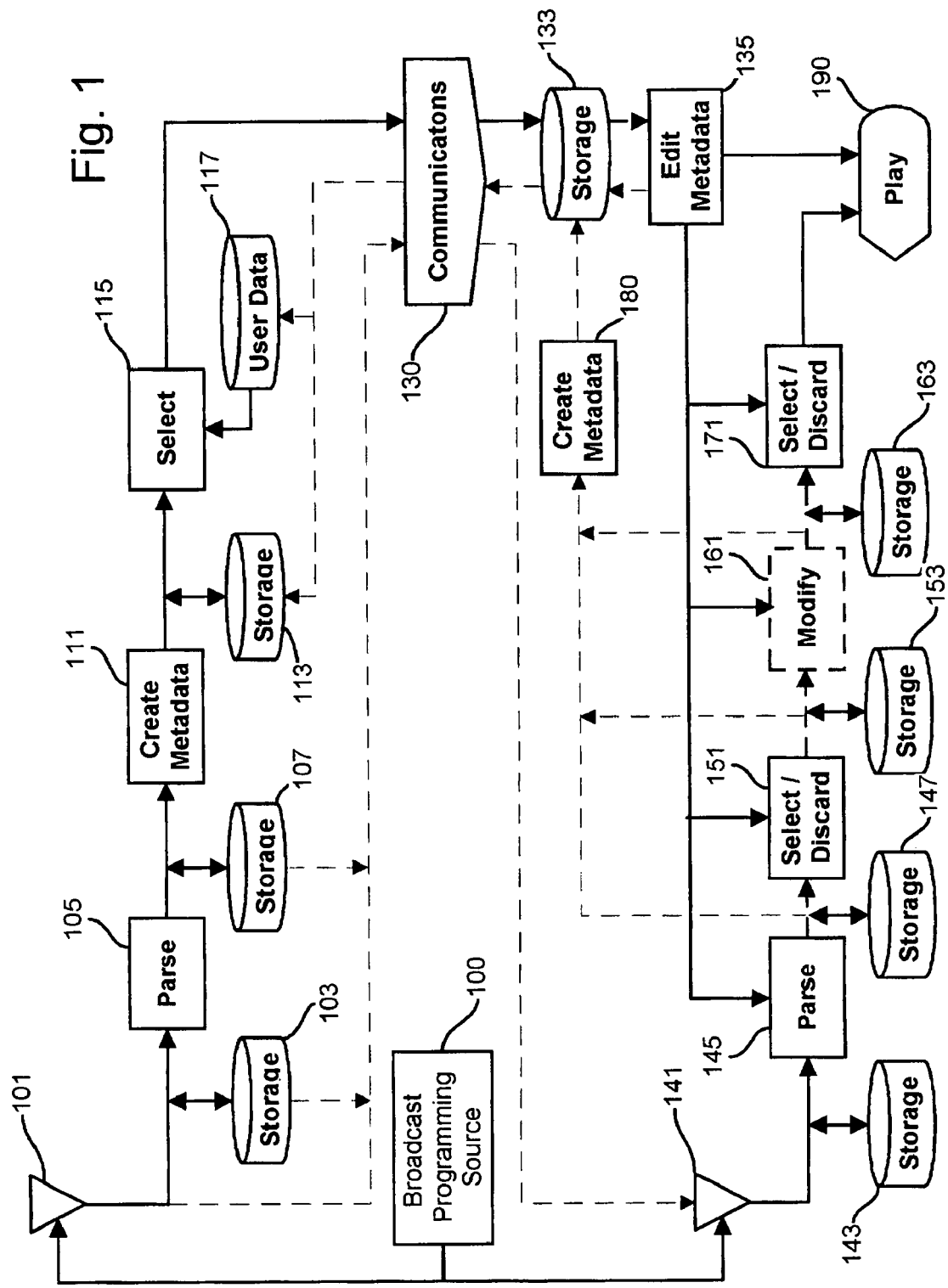
FIG. 1 is a schematic block diagram that illustrates the functional components which are used in a preferred embodiment of invention and which operate at both a remote location and at one of the user locations to implement the invention.

The present invention belongs to a family of related systems that use metadata to control the playback of broadcast programming as disclosed in the previously issued patents and previously filed applications summarized below.

U.S. Pat. Nos. 5,892,536 and 5,986,692, issued to James D. Logan et al. describe systems which employ metadata to selectively store, manipulate and playback broadcast programming. Some of the novel arrangements and features disclosed in those two patents may be summarized as follows:

1. A remote editing station, which may be at the broadcast facility or at a remote location, classifies, describes or otherwise identifies individual segments of broadcast programming and sends metadata (sometimes referred to as "markup data") identifying and describing those segments to a remote client receiver. For example, the markup data may identify individual segments by specifying the source and the time of the original broadcast, or by specifying some other unique characteristic of the broadcast signal. The program segments may be TV, radio, or Internet programs, or portions of programs, including individual songs, advertisements, or scenes.

2. The communication link used to transmit the metadata to the client may take one of several forms, including the Internet, a dialup telephone link, the communications pathway used to carry the broadcast signals to the client, or other forms of communication used to transport the metadata to the client.

3. At the client receiver, the metadata is used to identify particular program segments that may then be manipulated in one or more of a variety of ways. For example, the metadata may be used to selectively play back or record particular segments desired by the user; to re-sequence the identified segments into a different time order; to "edit-out" undesired portions of identified segments; to splice new information, such as computer text or advertising, into identified segments for rendering with the program materials, or to substitute different material (e.g. dubbing in acceptable audio to replace profanity to make programming more acceptable to minors).

4. The client receives and locally stores incoming broadcast programming and uses the markup data to identify desired segments within the stored program materials. The local storage mechanism may advantageously include means for concurrently recording live broadcasting while replaying a delayed version of the previously recorded programming as described in U.S. Reissue Pat. No. 36,801 issued to James D. Logan et al.

5. The markup data can provide a detailed "electronic program guide" to the broadcast programming previously received and stored in a personal video recorder (PVR) or an audio storage device, permitting the user to selectively play back a desired segment or portion of the programming previously recorded.

6. The markup data may be used to create a recorded collection of desired segments extracted from the buffered broadcast, allowing the desired segments to be saved while the remainder of the buffered materials is discarded to conserve recording space.

7. Special markup signals may be selectively sent to individual subscribers based on his or her indicated preferences so that only preferred program segments are identified and processed. For example, a subscriber might request markup data only for sports and news.

U.S. Pat. No. 6,088,455 issued to James D. Logan et al. describes related systems that use a signal analyzer to extract identification signals from broadcast program segments. These identification signals are then sent as metadata to the client where they are compared with the received broadcast signal to identify desired program segments. For example, a user may specify that she likes Frank Sinatra, in which case she is provided with identification signals extracted from Sinatra's recordings which may be compared with the incoming broadcast programming content to identify the desired Sinatra music, which is then saved for playback when desired.

U.S. patent application Ser. No. 09/536,696 filed by James D. Logan et al. on Mar. 28, 2000 describes further systems that employ metadata for selectively recording and/or reproducing received broadcast programming. The implementations disclosed in that application employ:

1. A receiver connected to record incoming broadcast signals and a PC connected to a web server via the Internet. A browser program running on the PC uses the web interface provided by the web server, selects songs of interest, downloads identification signals (e.g., extracted feature-sets or signatures) which uniquely identify the content of desired program segments (songs), which are then selectively saved for reproduction.

2. A signal processor that identifies characteristics of the stored programming (scene changes, voice vs. music, voices of particular people, etc.) that can be used to selectively store desired programming.

3. Identification signals derived from received broadcast programming at the client produce identification signals which are sent to a remote server which compares the received identification signals with a database at the server and returns attribute information to the client to describe recognized information. The attribute information can include the title of the segment, the name of the performing artist, albums that have a recording of this segment, etc.

4. Program segment files (e.g. songs) in a server library that are made available to those client locations which demonstrate that they are entitled to access the library copy by sending an identification signal to the server that is extracted from a copy of the desired segment already in the client's possession. Thereafter, a qualified client can obtain the authorized copy from the server from remote locations. Locally recorded programming can be uploaded from a client into the library, and such uploading can be "virtual" (that is, need not actually take place) when an equivalent copy of the same program segment is already stored in the server library.

U.S. Pat. Nos. 5,271,811, 5,732,216, and 6,199,076, and co-pending application Ser. No. 09/782,546 filed on Feb. 13, 2001, by James D. Logan et al. describe an audio program and message distribution system which incorporates the following features:

1. A host system organizes and transmits program segments to client subscriber locations.

2. A scheduling file of metadata schedules the content and sequence of a playback session, which may then be modified by the user.

3. The content of the scheduled programming is varied in accordance with preferences associated with each subscriber.

4. Program segments are associated with descriptive subject matter segments, and the subject matter segments may be used to generate both text and audio cataloging presentations to enable the user to more easily identify and select desirable programming.

5. A playback unit at the subscriber location reproduces the program segments received from the host and includes mechanisms for interactively navigating among the program segments.

6. A usage log is compiled to record the subscriber's use of the available program materials, to return data to the host for billing, to adaptively modify the subscriber's preferences based on actual usage, and to send subscriber-generated comments and requests to the host for processing.

7. Voice input and control mechanisms included in the player allow the user to perform hands-free navigation of the program materials and to dictate comments and messages, which are returned to the host for retransmission to other subscribers.

8. The program segments sent to each subscriber may include advertising materials, which the user can selectively play to obtain credits against the subscriber fee.

9. Parallel audio and text transcript files for at least selected programming enable subject matter searching and synchronization of the audio and text files.

10. Speech synthesis may be used to convert transcript files into audio format.

11. Image files may also be transmitted from the server for synchronized playback with the audio programming 12. A text transcript including embedded markup flags may be used to provide a programmed multimedia presentation including spoken audio text created by speech synthesis synchronized with presentation of images identified by the markup tags.

U.S. Utility application Ser. No. 10/060,001 filed on Jan. 29, 2002 entitled "Audio and Video Program Recording, Editing and Playback Systems Using Metadata" describes means at the user's location for creating metadata which may be used in combination with metadata provided by an external source, for editing metadata in various ways at the user's location, for automatically responding to user activity to generate new metadata which characterizes the user's preferences and which serves to automatically identify and describe (or rate) programming segments, and for responding in novel ways to the available metadata to enhance the utility and enjoyment of available broadcast materials. Methods and apparatus are employed for selectively controlling the presentation of broadcast programming in which a user viewing or listening to broadcast programming at a first location may take advantage of the insights provided by a different viewer at another location in order to control the manner in which segments of the broadcast programming are recorded and/or replayed.

The disclosure of each of the foregoing patents and applications is incorporated herein by reference.

Architectural Overview

The methods and apparatus contemplated by the present invention facilitate the selective storage, organization and reproduction (playback) of broadcast programming through the use of metadata that identifies and describes segments of that broadcast programming. This metadata can be created locally or at a remote site and transmitted to the user's location to enable the user to more effectively manage broadcast programming received at the user's location.

FIG. 1 illustrates in schematic form the manner in which information is processed in accordance with the invention. As will be described in more detail below, many of the structures and functions illustrated in FIG. 1 represent alternative or optional functionality that need not be present in all implementations of the invention.

At the remote location, broadcast programming from a source 100 is received at 101 and may be processed immediately or saved in a storage unit 103 for later processing. The incoming broadcast programming signals may be received as a live public broadcast, or may take the form of programming content received prior to the time of its later public broadcast. At 105, the incoming broadcast signals are parsed or subdivided into logically separate segments, which need not be contiguous and which may be overlapping or nested. The individual segments may be processed immediately after they are identified during the parsing process, or they may be stored for future processing in a storage unit 107.

As illustrated at 111, metadata is then created which describes each of the identified programming segments. The metadata describing each segment may take the form of a separate data entity, or may be stored or transmitted with the content of programming segment, which it describes. Unless the metadata is associated with a particular segment by being stored or transmitted with that segment, it includes a pointer or some other mechanism for specifying the segment or segments it describes. In addition, the metadata typically includes additional descriptive information about the associated segment(s). The metadata created at 111 may be immediately processed or transmitted to the user after it is created, or may be stored for later processing or transmission in a storage unit illustrated at 113.

Only selected items of metadata may be transmitted to the user location. The specific metadata transmitted may be selected as shown at 115 in a variety of ways. Data describing the demographics of individual users and data specifying user preferences stored at 117 may be used to selectively provide the user with only that portion of the available metadata which is best suited to the needs of the user or which a third party, such as an advertiser, desires to make available to the user.

Note that metadata created by the user, or preference data supplied by the user or derived from an analysis of the user's use of the system, or from the viewer's demographic characteristics, may be combined with or used instead of metadata and preference data created at the remote location.

Note also that the content of broadcast programming received at the remote site may be forwarded to the user location with or separately from the corresponding metadata. This content information may take the form of the broadcast programming received at the remote site at 101, previously received programming stored at 103, and individual segments as parsed at 106 and stored at 107. As noted above, the metadata associated with these programming signals may be combined with the programming content as transmitted to the user, or may be sent separately over the same or a different communications pathway.

The communication methods or apparatus used to transport metadata and/or content to the user as illustrated at 130 may take many different forms, including: the Internet, a dialup telephone connection through the public switched telephone network (PSTN), a wireless transmission system, cable, private line facilities, or data storage media transported from the content publisher and/or the metadata creator to the user. The communications may take place over a combination of such facilities and, as noted earlier, the content and metadata may be transmitted in one or both directions together or separately over the same or different facilities.

Metadata created at the remote location and transmitted via the communications facility 130 may be stored at 133 at the user location. The metadata stored at 133 may be edited at the user location as indicated at 135, and metadata from the user location may be returned via the communications facility 130 to the remote location for shared use by others.

At the user location, broadcast programming signals are received at 141, either in the form of a live public broadcast from the source 100, or as programming content received from the remote location via the communications link 130. It a leading purpose of the present invention to provide the user with a better and more convenient way to identify and reproduce that portion of the large quantity of programming that is broadcast for general consumption from many sources via many pathways, including conventional radio and television broadcasting, whether over the airwaves or via a cable or satellite facility. The metadata that is provided from the remote location via the communications pathway(s) 130 may be used to selectively store, organize and/or selectively reproduce programming received directly at the user location from a source 100, or received together or separately with the metadata via the pathway 130.

The broadcast programming content received at the user location at 141 may be immediately processed or stored for later processing and viewing. As described in U.S. Reissue Pat. No. 36,801 issued to James D. Logan et al. by the invention, the incoming broadcast programming may be concurrently viewed or otherwise processed while it is being recorded in a circular buffer for possible future use. A reserved portion of the storage unit seen at 143 may implement the circular buffer. This allows the user to utilize VCR-type controls to pause and selectively replay or process previously broadcast programming at different forward and reverse playback rates. With the pause capability, the system is constantly recording the last 5 minutes or so of a live radio broadcast, or the last 30 minutes or so of a live television broadcast. When the user hears or views a song or program that he or she likes, the user presses a "Catch" button, and the program will set aside the all of a predetermined part of the stored programming in the circular buffer, as well as a further predetermined part of the incoming broadcast that continues the saved portion, and retains both in temporary storage at 103. Later metadata may then be applied to that segment identifying the beginning and end of the program or song being played at the time the catch button was activated. If the button was hit after a program or song was over, but before or after another began, the system would assume the user was trying to capture the last played song.

Unless received in already parsed form from the remote location, the incoming broadcasts are parsed at 145 into segments that correspond to the segments created at the remote location at 105. As noted earlier, the available metadata may be used to subdivide the incoming broadcast signals into segments. For example, the metadata may identify incoming segments by source and by start and end times. Alternatively, the metadata may include "fingerprint" or "signature" signal pattern that can be compared with incoming broadcast signals to identify particular segments, and may further include timing information, which specifies the beginning and ending of each segment relative to the location of the unique signature.

After individual segments have been identified in the incoming broadcast stream at 145, they may be immediately processed or stored for future use in the storage unit 145. Not all of the segments that are identified may be of further use; accordingly, the available metadata may be used to select or discard particular segments as indicated at 151, and to process only the remaining segments, or selectively store them for future processing or playback at 153.

At 161, the selected segments may be modified or reorganized in a variety of ways in accordance with the metadata. For example, the sequence in which program segments are presented for playback may be modified, and programming materials not necessarily included in with the originally broadcast materials may be "spliced" into the presentation, or all or part of selected segments may be deleted from the presentation. The resulting program content which is in condition for playback may be immediately presented to the user, or it may be stored at 163 for selective playback at a more convenient time as indicated at 171 and 190.

As illustrated in FIG. 1 at 180 and 135, the user may create descriptive metadata and may edit metadata previously received or created in a variety of ways to personalize the storage, reorganization and playback of available broadcast programming.

It should be observed that the process of creating and editing metadata may be based on any one of the various versions of the received content; that is, the content as received and stored at 143, as parsed and stored at 147, as reduced to specific segments remaining after the selection and discarding process at 151, and as modified at 161 and stored for viewing at 163.

It is also important to note that the parsing, selection and modification processes may be performed at different times using, in each case, the most recently stored version of the programming content and the metadata that is available at that time. For example, metadata that is used to parse incoming segments at 145 may be made available from the parser 105 at the remote facility at an earlier time than descriptive metadata arrives from the remote creation process 111. The presence of the storage unit 143 allows received broadcasting signals to be held until parsing metadata arrives which will subdivide the received programming into logical units that can then be still later selected and modified with the aid of descriptive metadata that arrives only after it is created by the remote editing process. Note also that the metadata which arrives first to subdivide the programming stream into logical segments, as well as available metadata which describes those segments, facilitates the task at the user location of generating still further supplemental metadata which describes, rates, annotates or recommends programming content for other users.

In the description that follows, many of the features and functions summarized above and illustrated in FIG. 1 will be presented in more detail.

Program Source 100

The present invention contemplates the creation and use of metadata for describing and manipulating programming content of the type typically broadcast for public consumption by radio and television broadcast stations; disseminated by cable and satellite systems and, more recently, via the Internet; or published for general consumption on data storage media, such as DVD disks. This broadcast programming may be in analog or digital form and, in some instances, may be obtained from a content provider prior to being broadcast. It is important to observe that the "broadcast programming" from the source 100 is available for processing at both a remote station and at the user's location as illustrated in FIG. 1.

The principle illustrative embodiment as described below is used to select, organize, disseminate, store and reproduce television broadcast programming. It should be understood however that the principles of the invention are, with few exceptions, equally applicable to radio broadcast programming, to programming that is published via the Internet, and to programming such as movies which are transported to the user on published data storage media, such as DVD disks.

Storage Unit 103

While the parsing of programming content into segments and the association of descriptive metadata with those segments may be automated to some extent as described later, it is frequently desirable to provide one or more human-operated editing workstations which can used to adjust or "fine tune" the time position of markers which delimit the beginning and end positions of segments, and to manually compose descriptive metadata, provide qualitative rankings, and to otherwise classify or describe the content of each segment. The use of storage units 103 and/or 107 permits unparsed and parsed programming to be temporarily stored so that it may be processed through one or more multi-channel editing stations where a single operator can effectively insure the accuracy of the parsing process and the addition of descriptive metadata to plurality of concurrently received broadcast programming channels. These multichannel editing stations are used at 106 and 111 to subdivide program content into segments described by metadata. The multichannel editing stations employ variable speed playback techniques to control the placement of time markers, and may display close caption text in an editing window to assist the human editor in composing descriptive metadata and classifying the content. These multichannel editing stations scan the programming content in storage units 103 and/or 105 and place the resulting metadata in the store 113 for distribution to users as discussed later.

Parsing Broadcast Programming at 105

Automated means may be used to subdivide programming into segments. For example, segment delimiters may be created in response to the detection of scene changes (frequently indicated by blank frames in TV content) or by abrupt changes in overall image content when backgrounds change. In addition, voice recognition processing may be used to detect and automatically map the times when particular individuals are speaking. Predetermined image content may be detected to identify repeatedly used screen displays at the beginning and end of programs, and at program breaks or intermissions. In the same way, audio recognition may be used to identify standard theme songs and announcements used at the beginning of certain program segments. When such standard elements also serve as program segment identifiers, they may be associated with standard descriptive metadata that is automatically accessed from a library and added to form all or part of the descriptive metadata that is associated with the identified segment.

Frequently, when parsing television programming, the audio and video components have different time boundaries. For example, if it were desired to subdivide a football game telecast on a play-by-play basis, the audio description may well begin before and extend well after the actual play as seen in the video component. If the programming was segmented based on the video alone, the audio would be segmented in a somewhat non-optimal fashion while, in the same way, isolating a video segment alone might cut speakers off in mid-sentence. This follows from the fact that commentary is not frequently not timed to occur between the beginning and end of the activities shown on the video portion of the program.

Thus, it would be advantageous at times to split the audio at a different point from the video. This strategy might result, however, in interrupting a commentary underway when the next visual segment began. As long as the audio structure does not match the video structure, the human editor should be provided with the ability to independently select different beginning and end points for the video and audio segments, and then be provided with mechanisms for shortening the longer of the two, or lengthening the shorter of the two. The audio content may be lengthened simply by adding one or more periods of silence to the audio stream, and may be shortened by deleting silent periods to compress the presentation. The video presentation can be lengthened by adding "filler content", by adding freeze-frame displays, or by reproducing content in slow motion.

Another strategy is to optimize the "smoothness" of the audio splits at the expense of the video splits. Thus, instead of splitting the video at the moment the ball is hiked, it might be split at a logical break point for the audio at some point before the ball is hiked. This might make the video a bit choppier, but audio smoother. Note that the image presentation can be more easily lengthened or shortened by slowing or speeding the display rate or by duplicating or deleting frames, whereas the human ear would easily detects the change in pitch when an attempt is made to alter the presentation rate of an audio signal.

Other method may be used to separate out the songs from the audio stream are by use signal analysis to distinguish music from talkover or to distinguish one song from another.

Another method used to determine a markup point which will eliminate song talkover is to estimate the likely spot of the end of talkover by employing a database that specifies how far into a song you must go before finding the lyrics or main theme of each song, or the point at the end of the song when the lyrics or main theme ends. This "start and end of music" point, would be used as a best guess as to when the DJ talkover stopped (or if at the end of the song, when the talkover was likely to start again). The DJs themselves often have this information and often use it as a guide that allows them to talk right up until the point that the music starts. For stations that continually employ talkover, putting markers at these predetermined start and end points would provide assurance that no talkover was played with the song.

It should be noted that segments are not necessarily the contiguous results of subdividing the original programming signal. Segments can be unique, or can overlap or be nested within other segments. Moreover, a segment is not necessarily a subpart of an individual program as broadcast. A segment may be a combined collection or sequence of such programs, may correspond precisely to a single program as broadcast, or may be only one part of a longer program. Importantly, segments may be organized into groups of other segments or programs, and can form a hierarchy of sections, chapters, sub-chapters, etc. Thus, a single metadata entity may be associated in a variety of ways with a plurality of segments, while other metadata entities may be associated with only one segment.

Storing Parsed Segments

The programming content that is stored in discrete segments at 107 need not be a direct reproduction of the incoming program signal. Redundancies and overlapping content may be advantageously removed. For example, when audio content is stored, the periods of silence may be removed for more compact storage. The content signal may also be compressed if desired using, for example, MPEG compression for video and MP3 compression for radio broadcast programming. A linear programming process may be used to allocate segments for the scarce viewing time allocated by the user.

After the continuous broadcast data has be assembled into individual segments, it is frequently preferable to store those segments so that the descriptive metadata which describes each segment can be created, automatically or by a human editor, or both, and be associated with the program content at a pace which is independent of rate at which the segments were originally broadcast. The nature of the descriptive metadata as thus created is described next.

Creating Metadata at 111

First, it should be noted that if the metadata is not positionally associated with the segments it describes by being imbedded with, or transmitted at the same time as, the content data, some of the metadata performs the function of identifying the associated program content.

Stored segments may be identified by a file name, a URL, or by some other unique access key (such as the primary key value in a relational database storage system). When segments can be identified and accessed when needed using such an access key, simply including that key value with the descriptive metadata suffices.

However, when metadata created at the remote location must be associated with program content received at the user location, a different mechanism is needed. As one approach, the program segment may be specified by the combination of an identifier which specifies a broadcast program source (e.g. a particular broadcasting station or cable channel) together with the start and ending times at which the particular programming segment was broadcast. These "time stamp" values are sent with the metadata to the user location and matched against time stamp information associated with the broadcast programming when received at the user station. For example, a TV program segment may be identified by data indicating the segment was broadcast by WGN beginning at 11:23:42 to 11:32:16 GMT on Oct. 12, 2000.

At times, predetermined time shifts occur when programs are distributed over cable facilities and the like. When that occurs, predetermined time offsets can be added to or subtracted from the values specified in the metadata, either before or after the metadata is transmitted to the user location. The magnitude of these standard offsets may be determined by detecting the time when predetermined signal patterns are received at the user location, comparing that time with the time when that signal pattern was broadcast as measured at the remote station to generate the offset value to be applied to all segments experiencing the same time shift as the predetermined signal pattern.

The technique of detecting predetermined signal patterns may be used to establish not only the timing but also the identity of a segment of a sequence of segments. For example, one or more a unique "signatures" may be extracted or derived from a sequence of programming segments from a particular source. The metadata for individual segments may then include values that specify a time offset from the signature marker and, in that way, uniquely identify the segment.

The technique of identifying segments by means of "signatures" may be used when the stream from which the metadata was derived differs from the stream recorded by the consumer. For instance, if a local broadcast changed the timing of a broadcast program in order to introduce advertising of different lengths, or to add locally focused content not included with the version from which the metadata is made, problems would arise. As another example, the metadata might describe segments within a pay-per-view movie that might be received at different times by different users. In this case, "signature" or "content-based time stamps" may be used to associate metadata with the stored content under these circumstances.

When the metadata is created, a "signal pattern," or "fingerprint" extracted or derived from the content is used to identify a known time position in the "parent" copy of the version from which the metadata is created. This fingerprint or pattern may also uniquely identify the parent copy, distinguishing it from other content. This fingerprint exists at a measurable time offset from an "index point" in the parent copy used to associate metadata with the content. For instance, if the metadata were marking the beginning of an advertising segment, the fingerprint should be within and near the start of that advertising segment. Alternatively, the fingerprint to be detected to establish the time mark may be within only the first of a sequence of segments, with the first and remaining segments having start and end times expressed by offsets from the single time mark.

Metadata used to subdivide programming content may take a variety of forms. It may specify the position of markers, which delimit individual segments within a programming sequence by, for example, specifying byte offsets in a file of digital programming data, or by specifying the time position relative to some reference time when segments begin or end.

Alternatively, metadata may specify identifiable signal characteristics or "signatures" within a programming signal stream. These signatures may be detected to establish the time or data position of markers that may then be used as a base reference for data or time offsets which delimit the programming into segments. Such identifiable signal characteristics may occur naturally within the programming (such as scene changes in a video signal indicated by blank frames, the appearance of a new voice or other detectable signal pattern, or periods of silence) or may be created by ancillary signals inserted into the program stream or in a parallel transmission to serve as markers. Such ancillary signaling may take the form of as identification tones, framing signals, digitally expressed data, and the like.

Using pattern-matching techniques, each piece of content stored at 103 or 143 may be compared to a specific fingerprint signature. When a match is found, segments occurring before or after the matching pattern may be identified at both the remote site where metadata is created and at the user location where metadata from the remote site is associated with the corresponding received broadcast segment. Multiple fingerprints may be used in order to continually synchronize the two versions.

The viewing habits of users as revealed by usage logs may be analyzed to subdivide programming into logical segments. With a large enough base of users, a profile of viewing could be constructed for a given program which would tend to indicate when users skipped particular segments, or used the mute control to silence a particular segments, and to further identify segments which held viewer's attention. This type of observed behavior could be combined with other techniques, such as blank frame, scene and voice change detection, and analysis of the closed caption text to further automatically determine the boundaries between logical segments.

The segment boundaries chosen by automated techniques may be refined by a human editor who makes adjustments to the timing of the automatically selected boundaries as needed. Thus using automated techniques, it is possible to subdivide broadcast programming into logical segments and to provide a figure of merit rating which can be sent to those who view the same programming on a delayed basis to assist them in making program viewing and recording selections, and, if desired, to automate those selections in whole or in part.

Storing Metadata at 113 and 133

As noted earlier, metadata describing the segments identified during the parsing process at 105 may be created at 111 in a variety of ways and stored at 113 for potential distribution to users. In addition, metadata created by users may be received via the communications facility 130 to supplement or replace the metadata created at 111.

Metadata created by users may be shared directly between users. When shareable metadata exists at a user location, it may be "registered" by supplying its resource address (such as an Internet URL) to the remote location which then relays the URL to other users who directly access the descriptive metadata from the other user's metadata storage 133 in a peer-to-peer transfer. In this form, the remote facility shown in FIG. 1 operates as a registry or directory that permits users to share descriptive metadata about broadcast programming with one another on a community basis.

The remote facility may subdivide available broadcast programming into segments as previously described and then associate each segment with references or pointers to metadata created by users and hosted on user's computers or on an available storage resource (including, for example, storage space made available at 113 for storing metadata).

As an alternative, the metadata provided by users may include segment identification information. For example, a user may identify a segment of programming by marking its beginning and end, and then create metadata, which describes, rates or classifies that segment. Programming at the user location creates identification metadata for the segment using any of the techniques discussed earlier; for example, by extracting and transmitting a unique fingerprint from the identified programming and transmitting this fingerprint together with start and end offsets, or by identifying the programming source together with the time stamp information specifying the times at which the beginning and end of the segment were originally broadcast.

The user may review metadata supplied by other users and presented as a program guide to the available stored programming. Before the descriptive metadata from other users is displayed, the segment identification portion of the received metadata may be compared with the programming content stored at 143, 147, 153 or 163 (or with metadata stored at 133 which identifies the content available to the user). In this way, only that descriptive metadata from other users which describes available programming need be reviewed.

Alternatively, a viewer may transmit a request to the remote facility for additional information about a particular program (which may include multiple segments), or the preferences of the user as stored in 117 may be expressly stated by the user or derived from the user's viewing history. These requests and/or preferences stored at 117 may then be used at 115 to select desired metadata (including references to metadata stored elsewhere) in the store 113 for transmission to the requesting user.

Thus, the metadata which is created by created by and shared among users one or a combination of the following forms:

1. Qualitative (rankings, reviews, etc.);
2. Descriptive (summary, topics, etc.);
3. Segment identifications (start time, elapsed time, ending time, source, detectable characteristic, ancillary codes); and
4. Cross-references or pointers to metadata stored at addressable resource locations, including metadata created and hosted by other users.

Metadata that includes the URL of a World Wide Web resource provides a robust mechanism for associating the content of particular segments of broadcast programming to both additional information and related interactive transactions. For example, metadata may be associated with programming that permits viewers to learn more about or to purchase products or services related to the programming content. As described above, individual users may also create addressable resources, such as Web pages, and associate links to those resources with viewed programming segments. For example, a fan club for a particular actor might create a Web site devoted to that actor, and then share metadata containing the URL to that Web site with other viewers.

The user's ability to create and share metadata that describes, classifies or relates to selected broadcast programming segments thus enables users to create a community surrounding those segments in which a rich variety of information exchanges and transactions can occur. Users can, in effect, use the subject matter of broadcast programming as public bulletin board upon which to post comments about the program, ratings and descriptive data which can be used as a basis for indexing and retrieving program content, and for linking in related information from other sources, or for conducting a marketplace by posting offers to sell and to buy goods or services relating to or suggested by program content.

A "Community Markup" system (here called "CM") may be implemented that serves two purposes: it may be used as a way to develop markup data for sources of program information that may have an insufficiently large audience to justify the creation of markup by a commercial enterprise, or to improve the quantity or quality of markup data offered by commercial sources.

To optimize the benefit of the community markup, program guide data may be made available to potential users to identify what stations to record. As users can't go back after a broadcast and record it, this method would insure the maximum number of recorded copies will be available both for markup and playback with any CM effort.

CM can also be used to improve previously produced markup information. For example, if the markup does not accurately reflect the extent to which an announcer may have "talked over" a song, users will have editing tools available to them to alter the placement of the song delimiters and excise the talkover. The CM system will allow users to join a community whereby they will be able to upload their improved markups to a central server at 113 so that other users may access them. A "barter" system may be employed so that, when a user creates original markup data, he or she would then be entitled to receive markup data from other users, potentially avoiding the free-rider problem.

Improved markups may be downloaded and used to improve previously recorded songs or other content stored at 143, 147 or 153 in an automatic mode. Thus, even if several days elapse before the improved markup is available, the existing recording library would be automatically upgraded. This upgrading of the library would be performed transparently to the user.

As the originally recorded material is still in local storage, and only the metadata defining the playback markers is altered as a result of the new metadata, the recipient of community improved markup could always "undo" the automatic marker movement and restore the original recording and associated splits.

In cases where the system receives multiple markups, they can be averaged together for greater accuracy with outliers being deleted. This averaging function can be performed either at the server based on metadata received and stored at 113, or at the user location based on metadata received and stored at 133.

Note that community created markup would not necessarily have to be stored on a central server. Markup data can be stored solely on user machines and shared via peer-to-peer transfers (e.g. using an architecture of the type employed by Gnutella). In this environment, users would employ shared directory, which would identify metadata about a recording they had made, which exists in storage at 133 at another user location.

Community Markup (CM) may be created as a byproduct of the user's use of locally generated metadata for creating a personalized program library. For example, the user may record a lengthy radio broadcast from a favorite station and then selects particular songs for inclusion in a personal library, either by using markup signals provided by an remote markup source, or by using the available editing tools at 135, the songs which are identified may contain DJ talkover at the beginning or end of the song. In that case, the user may be employ a one-step-editing feature that permits the user to listen to a song and, when a transition occurs from talk to music, or visa versa, they can simply click on a "scissors" button which moves the start-point or end point of play, for that song, so that, the next time it's played, the new start and/or end point takes effect. Importantly, the talkover is not erased and the play marker is merely moved. If the user did not time very well the use of the scissors, he can hit an "undo" button and redo the clipping process.

At any time, the user may elect to share the locally stored markup signals with others by transferring that markup to the server for storage at 113 where it is combined with the markup produced by others for that station and time frame, or by transferring the markup to another user with a peer-to-peer transfer. In this way, not only is the markup shared which accurately identifies desirable programming, the markup also operates as a recommendation for that section and, when aggregated among many users, offers the ability to identify and share the "best of today's programming" on a particular station.

A mechanism related to the "scissors" function described above would enable a given program segment (e.g. song) to be "split out" from the original program recording. Because the available metadata may not accurately identify the precise beginning and end point of a given song, a predetermined duration of programming is included at both the beginning and end of each song as identified by the preliminary metadata. This extra time provides "running room" to make sure that every program has at least the entire rendition in it. Since this extra length could include material from the program segment behind or ahead of the segment being edited, the interstitial material in the nebulous space between songs is duplicated and added to both songs as defined by the metadata. The user may then user the editing means, including the "scissors" function noted above, to provide a final adjustment to the start and end time. When program segments are permanently stored in a selection library, the added material excluded by the final edit may nonetheless be retained at both the beginning and ending to preserve the ability to adjust the start and end points even after the selected program segment is persistently stored in the library.

Programming may be described, classified and rated using metadata formats. Standard rating systems have been widely promulgated using the World Wide Web Consortium (W3C) Platform for Internet Content Selection (PICSJ). The PICS specification enables labels (metadata) to be associated with content and was originally designed to help parents and teachers control what children access on the Internet, but also facilitates other uses for labels, including code signing and privacy. PICS labels, and other metadata, may be advantageously expressed using the W3C's Resource Description Framework (RDF) which integrates a variety of web-based metadata activities including sitemaps, content ratings, stream channel definitions, search engine data collection (web crawling), digital library collections, and distributed authoring, using XML as an interchange syntax. Details tutorial information and formal specifications for PICS and RDF are available on the World Wide Web at http://www.w3.org/pics/ and http://www.w3.org/RDF/ respectively.

Storing User Data at 117

Whether the metadata which relates to programming segments is created at the remote source or at one or more user locations, it is frequently desirable to organize or filter the metadata so that they user can more easily obtain the benefit of that metadata which best fits the needs or desires of the individual user.

One mechanism for limiting the amount of metadata actually presented to the user is to simply store all received metadata at 133 and then to employ means for sorting and/or indexing the stored metadata so that desired metadata can be located in response to the user's specifications. As alternative, the user's specifications may be uploaded via the communications facility 130 and stored at 117 at the remote facility. The user's specifications or preferences as stored at 117 are then used at 115 to select only that metadata which best fits the user's needs for transmission to the user's metadata storage at 133.

The user's preferences may be derived from his or her activity. For example, the particular programs a user chooses to save or view may be monitored to determine the user apparent content preferences. Preference data may be produced at the user's location and stored with other metadata in the store 133, from which it may be used locally or sent to the remote location for use there. Alternatively, "user log" data recording the user's activity may be transmitted to the remote location where it is analyzed to produce preference data.

Metadata which is derived from an analysis of the recorded viewing or editing choices made by other viewers, which may be termed "implicit metadata," includes values such as: the number of users with whom the viewer had common tastes who watched a particular program, or metadata based on analyzing such events as (a) who surfed out of, or did not complete watching, a certain show, or never recorded it in the first place; (b) who took a certain amount of time to watch the recording (if it's a preferred program to a viewer, it will be viewed sooner; or (c) what percent of the program, on average, was skipped.

Once the preference data are determined, they may used in a variety of ways:

a). Preference data may be used at 151 to select or discard particular received broadcast segments so that only those which are more likely to be of interest to the user are saved, thus conserving storage space;

b). Preference data may be used at 161 to modify program content by, for example, inserting, interleaving or substituting advertising or other materials with received program materials based on the users interests;

c). Preference data may be used at 171 to assist the user in determining which received segments to play, either by automatically presenting those segments most likely to be of interest to the user, or by presenting a program guide containing or highlighting segments of interest from which the user makes the final program selection;

d). Preference data may be used to help the user select program segments which are made the subject of additional, user-created metadata which is then used locally (e.g. bookmarks or notes for the user's own use) or uploaded to the remote location or shared with other users as noted above;

e). Preference data may be used at the remote location where it is stored at 117 and used at 115 to select metadata for transmission to the user;

f). Preference data for individual users or combined preference data from many users may be used at 103, 107 and 113 to determine which programming content and descriptive metadata should be stored, and when previously stored content and metadata should be discarded, to make the most efficient use of limited storage space in light of user demand; and g). Preference data may be collected based on the usage of, or ratings supplied for, the metadata itself. In this way, users may rate the perceived value of metadata created automatically or by the editors at the remote facility (at 111) and this rating data may then be used at 115 to select not only programming of particular interest but also to select the metadata deemed to be of the most value.

Note that the metadata created at 111 and/or 180, and stored at 113 and/or 133, may include metadata used to display an electronic program guide (EPG) for the user which displays in some convenient format information concerning the content of available broadcast programming. Such displayed metadata associates items of descriptive information with one or more program segments. It is thus frequently advantageous to provide the user with means for associating user-created comments, notes, reviews, ratings, and the like by using the EPG display to identify and select the program segments with which the newly created metadata is associated. Metadata created in this way is thus readily shared with other users who share comparable EPG metadata by the simple mechanism of permitting a user to request additional information about a displayed program guide item.

As noted earlier, metadata created by individual users may be simply stored locally at 133 as an Internet accessible resource. Web crawling "spider" programs executing on remote computers may then retrieve and index this metadata and then act as "search engine" directories that may be publicly accessed to locate metadata of interest. For example, a search for "Stardust" might locate metadata describing an audio recording of the song by that name, biographic programming about the composer or performing artists, and the like. Thus, the descriptive metadata created by professional editors and/or users can form the basis for finding and enjoying content that would otherwise be difficult to index because of its non-textual character.

Metadata can be developed to characterize individual program segments by processing log file data representing choices made by users in selecting and/or abandoning programs, and from program ratings expressly provided by users. When aggregated by retrieving and combining such data from many users, and when further correlated with demographic data about the same users, rating information can be provided which tends to indicate what other viewers having similar backgrounds and similar past preferences preferred among the currently available program materials.

Ratings data compiled from actual user selections may provide unique information on how specific consumers react to specific songs at specific times. Thus, a recording studio might release a new single, and immediately thereafter determine how many listeners in a certain demographic had deleted, saved, or listened to that song multiple times. Express song rating data provided by users could be used in addition to or instead of implicit rating data to identify specific program segments that were well received or uniformly disliked.

When programming is broadcast in one geographic area before being broadcast in another, or when programming is repeated, the viewing and listening behavior of users exposed to the earlier broadcast can be used to provide rating information for later users. Thus, the habits of TV viewers on the east coast of the United States could be analyzed in advance of the later rebroadcast of the same programming on the west coast, so that ratings data tending to reflect which of the programs were preferred may be supplied to west coast viewers in advance. In addition, west coast viewers would have the benefit of advance reviews and summaries of programs created during the earlier broadcast. In the same way, any viewer using a personal video recorder (PVR) or other means for accessing program materials on a delayed basis could be aided in the selection of that program which they, as individuals, would be most likely to enjoy by the availability of rating and review metadata from earlier viewers having similar interests.

Content and Metadata Communications

The transfer of both content and metadata is illustrated at 130 in FIG. 1. As described here, both the remote location and the user location may receive and process programming signals (content) from a broadcast programming source. In addition, content may be sent from the remote location to the user location, and content may also be sent from the user location to the remote facility or to other users on a peer-to-peer basis. By whatever path is used, the content which is presented to users is made available to a large number of potential users, and the metadata which describes that programming material is created to aid those users (or particular users) to selectively record and view this programming material.

The metadata may be created at the remote facility and transferred on a selective basis to individual users, or it may be created by users and transferred to the remote facility for redistribution to other viewers, or it may be transmitted directly from user to user on a peer-to-peer basis.

The metadata may be transmitted with the programming content, or may be transmitted at a later time, or over a different communication pathway. In many program transmission systems, some of the available bandwidth is allocated to metadata, as typified by program guide channels or time slots provided by the vertical blanking interval (VBI) in a television signal. These existing pathways may be used to transfer the metadata contemplated by the present invention which contemplates, in many implementations, the transfer of metadata after the programming material has been broadcast but before the programming material is viewed on a delayed or time-shifted basis after having been recorded earlier.

Thus, as described here, the metadata may be created by editors or viewers who comment on or rate viewed material at the time of or after its initial broadcast, with the metadata being transferred to end users to facilitate the selection, recording and playback of desired material on a time shifted basis. In summary, the metadata flow need not be transmitted before or concurrently with the original broadcast, but is may be created by early viewers and used by later viewers who watch the programming on a delayed basis, either because the version they watch was broadcast later or because the version they watch was previously recorded for later viewing.

Creating and Editing Metadata at the User Location

As previously noted, metadata may be both created (at 180) and edited (at 135) at the user location. The user may programmatically derive this locally created metadata from the viewing choices made without requiring any additional effort by the user, or the locally created metadata may be the result of interactive choices made by the viewer. For example, a viewer may receive metadata from the remote source which takes the form of an electronic program guide describing broadcast programming, and with respect to each item of such programming, the locally generated metadata may indicate whether or not given program segments had been (a) selected for storage for potential later showing, (b) selected for actual viewing, (c) viewed for a specified period before being terminated, (d) saved for later repeat viewing after having been viewed, (e) expressly rated by the viewer, or (f) made the subject of a written text review. This locally generated metadata reflecting the user's use of or assessment of the programming materials, as placed in storage unit 133, is then uploaded to a remote processing site for distribution to other viewers or simply placed in an addressable location from which it may be retrieved for processing by one or more rating services or by other viewers.

When the user stores broadcast programming in the store 143, the user has no control over the incoming content. To more easily control what is saved for possible future playback, the user may be provided with a "Never Again" button. Whenever the user is listening to or editing a program segment, such a song, or has highlighted that program in a library program listing, the user may press the Never Again button to prevent that song from being recorded or, if recorded, to automatically prevent that song from being presented to the user in a list of available songs. Alternatively, pressing the Never Again button may also permit the user to prohibit the listing of any song by a particular artist, of a particular song by any artist, or further editions of a serialized program.

Over time, the use of the Never Again button may be used to develop a "negative screen" of preferences for that user and may be used to automatically eliminate or reduce the number of program segments or songs related to a program song excluded by the Never Again button. The Never Again button may also be one of the several ways that users will be able to accumulate preference information that can be used to control playlists transmitted from the server or created locally by the user. Note that, like other metadata, the Never Again list is kept as a separate file and users may undo a Never Again designation at any time so that it will have no further effect on existing or future recorded content.

Instead of a negative filter, a huntlist, or "positive" filter may be used as well. With a huntlist, a user identifies which songs or which artists he wants the system to capture. In addition, a huntlist may contain "songbots" (algorithms that search for described types of songs that the user wishes to have captured). A typical songbot could be "All Top 40's from the '70's". Other huntlists may be created using collaborative filtering techniques. Huntlists may be compared with metadata developed at a remote server (with the comparison occurring at either the server or the user location) to flag desired songs as they arrive from the broadcast source and are stored at 143, or they may be used a sieve, whereby hunted songs are saved and non-hunted are deleted and never presented to the user. When songs are "found" by a huntlist created at a remote server, an email may be generated telling the user that new songs are now in the jukebox. When the huntlist operates locally, a dialog box or the like may be used to alert the user to the presence of the desired song or program segment. In addition, the user may access his huntlist and see through a visual cueing of some kind (different colors for instance) which songs have been captured and which have not.

The huntlist may be compared with metadata describing the programming broadcast by a plurality of different stations to identify stations and times when desired programming is most likely to occur, and a program controlled tuner may then be used to automatically capture broadcast content from the identified stations at the identified times. When program segments or songs identified on a huntlist are available for purchase, a "Buy" button or a "Sample" button, which allows a user to hear a sample of a song, may be presented to the user to enable the purchase to be evaluated and executed if desired.

Automatically Bookmarking Programming Content

The system contemplated by the present invention may further include a mechanism at 180 for automatically defining and generating bookmarks which may be applied to the content stored at 147, 153, and/or 163 to facilitating navigation of the stored content and/or for personalizing content as performed at 151, 161 and/or 171 to thereby selectively control the playback of programming materials at 190.

The leading objectives of the automatic bookmarking mechanism contemplated by this aspect of the present invention are to:

1. Automatically specify segment start and stop delimiter positions (at 145);
2. Automatically categorize the segments;
3. Automatically create descriptors for the segments;

4. Automatically eliminate redundancies if necessary at 151 and/or 171; and 5. Automatically concatenate related pieces of a story at 151, 161 and/or 171 to implement one or more different ways to watch television Content that is well suited for these bookmarking techniques consists of segment-able programming like news, sports, or shopping programming, but some techniques apply to other types of programming as well. The automatic bookmarking mechanism may be implemented with a variety of available technologies, including natural language processing, voice recognition, face recognition, sound recognition, and probability theory.

The bookmarking system can operate on the client side as noted above, or at 111 at the central facility (which can include at the broadcaster's facility) to create bookmarking metadata that may thereafter be downloaded to the client with the program (if the analysis work is done ahead of time) or via a separate channel such as the Internet. The bookmarking metadata may be created ahead of time before broadcast, or more likely, after the broadcast when there is a short window of time to create metadata before the viewer watches time-shifted material.

Creating Bookmarks from Close-Captioned Text

The preferred system may make extensive use of the closed-captioned text. The close caption text will be feed into a Natural Language Processing Engine (NLPE) in order to interpret the meaning of the material. When the system determines a change in topic, a marker is set. The system will also attempt to categorize the material and generate a short "slug" describing the material.

The closed caption material is typically fed into the NLPE system in blocks, as the system can process the material faster than it is broadcast. As a topic break might lie close to a break between blocks, the system processes overlapping blocks as needed to be sure no breaks came between, or close to the endpoint of a block. The close caption text, when fed through the NLPE, may also be used to generate a caption for each individual segment as well as to categorize the segment.

Closed captioning can be done live or ahead of time. When done ahead of time, it is synchronized quite tightly, within a fraction of a second, with the program content. For live captioning, tight synchronization is not typical, and the delay can be on the order of a few seconds. When loosely synchronized caption exists, the system may automatically attempt to re-synch the captioning with the video after recording. One way to do this would be just to use some measure of average delay for that type of content and adjust the captioning accordingly. A better method employs face recognition or shape recognition to analyze the video content to determine when a person is speaking by focusing on lip movements. The captioning could be re-timed to match up with the end of a speaker's as often as needed. Alternative, voice recognition could also be used when the captioning reflects the spoken sound track. Note that the accuracy of the voice recognition would not have to be very high since, if a definitive match was found every few words, the time delay could be re-adjusted until a subsequent match is found.

The bookmarking mechanism may use speech recognition in combination with a database of navigational words that commonly indicate that a break or segue is in process. These would include words or phrases such as "coming up next", "next week", "Over to you, Bill", etc. "When we return" would signal the start of an ad. Questions might often indicate a change in direction of the content. When such a phrase was located, a marker would be generated. Alternatively, the closed caption text may be scanned, or using voice recognition software may be used to process recorded speech, to find these words and phrases.

The manner in which users view a given program may be monitored to position automatically generated bookmarks. The video playback system typically includes a fast-forward mechanism that permits a user to rapidly search through a program until a passage of particular interest starts, at which time the user returns the player to normal viewing speed. Typically, the image can be seen during this movement and sometimes the audio can be heard as well, particularly if it is time-scaled to give the audio pitch control. This fast forwarding activity may be monitored to identify the beginning point of a segment of interest. The system is preferably able to collect and aggregate such bookmark position data on an anonymous basis, perhaps just from a minority of the total users, to identify the points in each piece of content where users frequently resume normal playback speed after fast-forwarding to a desired position. Note that, in general, the important bookmark to get right is the beginning of a segment. The end of a segment normally takes care of itself as people often skip out before getting to the end, or if not, the end of one segment becomes the beginning of another. The point is that few viewers fast forward to end a given passage, but rather fast forward through a segment or sequence of segments until the beginning of the next desired segment is reached. Due to this fact, time scaling is a useful tool for finding segment beginnings. This is because some number of users will scale forward rapidly, still understanding most of what is being said if the audio is able to be heard, or will be able to view a fast motion version of video programming, and will then slow down when the interesting material starts to play. It is this inflection point we are looking for. It will indicate a change in interest level to most viewers and thus could serve as a source of auto generated bookmarks. The preferred system accordingly aggregates time scaling commands from a large number of different viewers to deduce segment beginnings as an average of a concentrated group of these fast-to-normal transition times.

Viewers will typically overshoot the actual beginning of the next segment as they cannot discern that a new segment has started until they watch or listen to a bit of it. Some percentage of viewers may go back and try to start at the exact beginning, at least for some segments. As a result, the best way to fine-tune the estimate of the location of the segment beginning point would be to estimate the average overshooting error and subtract that distance from the deduced segment based on the average or calculated segment beginning. This average-error-length could be found through empirical study, or deduced, by again, monitoring viewer behavior on the system and watch that small number of viewers who go back and rewind to get to the exact beginning of a segment. In general, the system described by this invention would wish to err on the side of starting the segment too early as opposed to starting within the segment.

Since large numbers of people fast-forward through ads at high speeds, aggregating the data around these clusters (dropping out users who are obviously fast-forwarding past the ad itself) would give a good indication of where the ad stopped. Since the average user stops a certain number of seconds after the ad ends, this average stop time, minus the average error, could be used to deduce the end of the ad and start of the next segment.

By the same token, the aggregation of data which distinguishes program segments which are frequently skipped by fast forwarding from those that are viewed normally can be used to identify popular segments. For example, a substantial number of viewers may fast forward through the Tonight Show to find the Top Ten segment. The system can learn to spot these clusters of segments or content through which other viewers have fast-forwarded, label them and pass them on to other users allowing them to skip over these unwanted segments instead of fast-forwarding through them.

In particular, Hot Spots would be most interesting if the comparative group was matched the profile and preferences of the viewer. This would give it more of a collaborative filtering capability.

Another form of metadata that could be automatically generated from other viewers' actions is which segments elicited an interaction by other viewers of iTV functions. These might include an interaction with a Wink-like system whereby sport statistics are available over the data channel of the cable operator. For instance, a viewer might wish to focus on segments in a History Channel program where other viewers had accessed background information. Another example involves t-commerce and systems that allow viewers to purchases an item from the TV using the remote. In a home shopping channel, this sort of metadata could serve to guide a user to the hottest items to buy.

Sound Cues

For purposes of this section, it is useful to define a new type of content here called "rolling content." Whereas segmentable content includes news and weather and linear content includes shows like "Friends" and movies like "Gladiator," rolling content would include programming such as a soccer or hockey game, which is a hybrid. Programming with rolling content have periods of higher and lower interest, and some climaxes like goals, but the "breaks" are more analog in nature. Many cues indicative of a break in rolling content could be deduced by sophisticated audio recognition. Important sound recognition types would include laughter, applause, referee whistles, and crowd noise. Crowd noise for instance increases dramatically every time a home run is hit, or a shot on goal is taken in a soccer game. The system could understand how long it takes on average to develop a play in soccer that would cause a cheer and drop a marker in several seconds before each instance. In a comedy program like the David Letterman show, the "action" is expected to be continuous, so a marker would be dropped in after each instance of laughter, presuming that is the beginning of the next joke. A software algorithm might detect other types of sound information such as the level of excitement in a speaker's voice, or the quickness of speech. These variations could be transformed into bookmarks. Different algorithms could be developed for each type of sound, and vary by each show. The user could do further modification of the algorithms, for instance, deciding to watch 10 seconds rather than 30 seconds of content leading up to a crowd's roar. Alternatively, the system might "learn" preferences such as this by monitoring the specific user's use of the fast forward button or time scaling feature.

Recognizing Repeating Patterns

Multiple copies of the same show may be analyzed to see if patterns repeat themselves. These patterns might be in the video or audio and might signal the beginning of a segment. For instance, the appearance of the weather map might indicate the beginning of the weather report. The system would look for pattern markers that were spaced apart about the length of an expected segment. As stated earlier, the time scaling or fast-forward usage information could be used to confirm that these bookmarks are usable. In addition, if nobody is skipping forward to them, that tends to indicate they might not be correct.

Music Recognition

A music discriminator, that is a signal analyzer able to discriminate between music and talk and deduce when music is playing in the background, can be used to provide bookmarks. Music analysis may also be used to distinguish one type of music from another, and perhaps distinguish bands or songs. These algorithms could be useful for detecting breaks in a video show, as well. This technique could be particularly useful for detecting ads as many start with music.

For rolling content or linear content, detecting the type of music playing might be useful. In many cases, music is used to highlight the "essence" of a movie. In many movies, a characteristic type of music played during each action scene or love scene, for instance. Metadata based on the type and location of this background music could be used to classify areas of content into different moods or types of content such as love scenes, action scenes, etc. A user could use this information to just play back these portions of the content.

Another form of similar metadata would be the frequency of scene changes. More scene changes would indicate more action. By the same token, the degree of motion in the image itself can be detected from the amount of redundant information that is dropped out in the encoding process. This information could be used to deduce or measure the degree of motion in the scene, information which could be used to deduce the "action level" in the scene, perhaps in conjunction with other indicators.

Character Changes

The preferred system would be able to detect the coming and going of characters, announcers, or actors in the programming. This could be done through face recognition technology or through voice recognition (where different peoples' voices are recognized regardless of what they are saying). In news shows, this would be particularly useful when one announcer hands off to another. For other types of programming it might help to automate our "Favorites" Way to Watch (which we typically describe as a way to track Tiger Woods through a golf tournament). Further logic, implemented using data generated from voice or face recognition, may be used to determine who was the anchor and who were the subsidiary reporters. The breakpoints could be focused on the times where the camera went back to the main announcer.

Visual Cues

Scene recognition (as opposed to scene change recognition) would be useful in deducing breakpoints. Similar to sound recognition, visual recognition could (either now or in the future) spot when two newscasters were using a split screen, when stock prices were on the screen, when a ball went into the basket, etc. Overall visual metrics, such as the amount of movement on a soccer field, could be indicative of a timeout or frantic action.

User-Generated Bookmarks

Another form of non-tagging-station-generated bookmarks would be for users to create their own bookmarks by clicking a button as they watched the programming. This could be related to the Save feature (see below), or merely to enjoy while re-watching the programming. The user could also have the option to categorize and label the segment if both beginning and end points were denoted. If enough users in the monitored sampled bookmarked the same scene, the system could average these locations out to present a definitive mark to other users. In the same way, when a user bookmarks a spot in order to save a segment, this new viewer-generated location data could be used to create the deduced bookmark.

There are four types of viewer-generated bookmarking information: Fast-forwarding or other analog motions through the video, bookmarking for later repeat viewing or showing to others, bookmarks made to send to a friend, and bookmarks made for purposes of saving. In this list, viewers can be assumed to have the most thought into the actions later in the list. Viewers saving segments would therefore be presumed to have put the most thought into the exact placement of the bookmark. As a result, as data from these multiple sources is compiled and synthesized, extra weight would be put into the latter categories. The exact weightings could be tested through empirical testing. That is, an editor could study the video and determine the "proper" bookmark locations and then develop a model for using these data inputs in the most accurate fashion.

Note that once "deduced bookmarks" start to be presented to viewers, the system would cease to collect as much new information as viewers' navigation actions would then be based on the data being supplied. Therefore, the system would have to decide at what point enough field data had been collected before dispersing its deduced bookmarks.

Once deduced bookmarks were distributed to viewers, the system would monitor their usage. If some minimal number of viewers jumped to the given deduced bookmark but then shortly thereafter fast-forwarded a short distance, or re-wound a short distance, this would be interpreted by the system as an attempt to adjust the bookmark. This adjustment distance would then be used to re-adjust the distributed bookmark going to viewers for the first time, as well as used to re-adjust bookmarks that were "in the field", that is already distributed. Again, data coming from viewers known to be "careful adjusters" would be given extra weight.

Certain viewers might be determined to have better skills in determining accurate skip points. This might be determined by looking at how well their marks clustered around the average location for a given markup point. The markup points offered by these users could then be given extra weight in the overall averaging process.

The averaging process could take into account multiple inputs—viewers' fast-forward stopping points, viewer-generated bookmarks, viewer-created segments that were saved, viewer adjustments, etc.

Aggregate User Feedback Used to Edit Breakpoints

Above we discussed how break points could be deduced by watching user's actions from which we could deduce breakpoints. Another way to use aggregated data is to watch how viewers use our proposed bookmarks. For instance, take the case of generating a break mark when the news announcer changes. This may not be the signal of a new story—it may just be the anchor handing off to a field person for a report. We could deduce that by watching how early users of the metadata don't skip at that break point, but watch the preceding section and go right on through this supposed next segment. If it were truly a break in the content, some percentage of people would be assumed to skip at that point or close to it. Therefore, if a bookmark is not used by some minimal percentage of people (who have watched the entire previous segment) as a launch pad to jump forward from, it would be assumed to not be a meaningful break. If no one uses a bookmark, then by definition it is not useful.

Correspondingly, if a high enough percentage of viewers skip out of the previous segment and then shortly skip out of this second segment, it could be assumed that the content is too similar and again, it is not a meaningful segment marker. Again, by definition, if there is an extremely high correlation between viewers skipping one section and then the second, the two are probably very closely linked and probably the same segment.

The exact percentages needed to make these decisions can be empirically tested as stated above.

But in general, the system can be organic and self-correcting. For instance, field data can always be used to second-guess a decision made by the system. If the system for instance, erases a marker, and then sees monitored viewers starting to fast-forward through material demarcated by the old erased marker, it can re-insert the marker.

Combining Different Metadata using Bayesian Statistics

The NLPE will not always accurately segment the show. As such, it will be useful to combine this technique with others. Each technique will add additional information in determining the probability of a break. For instance, scene change analysis will be used to deduce when a scene occurs. If such a change occurs close to where the close caption analysis suggests there may be a topic change, then Bayesian statistical modeling will be used to predict the probability of a break.

Time-Based Data

Further data to add to the Bayesian analysis would include the time duration since the last break. Each program could have stored a frequency distribution of how often a topic change occurred. As the time-since-the-last-break increased towards, and then past, the average length of a segment, it increases the probability that an inference of a topic break is, in actuality, a real break. This time-based data would be added to the data synthesized by the Bayesian tool.

In other words, it's unlikely that CNN News would have a 10-second story. So the time-length factor would sharply mitigate the probability of the system producing a break after ten seconds even if the closed caption text and scene change analysis suggest such. On the other hand, segments rarely go past 2 minutes. So as the length of a segment approached a long duration, the "benefit of the doubt" would start to swing towards designating a break. Bayesian statistics is the methodology of revising probabilities based on new data.

Double-Indexing

Another goal of the system would be to develop two levels of bookmarking—one equivalent to chapters and one equivalent to paragraphs. The methods discussed above could all be adapted to determining minor changes from large ones.

By the same token, the system could produce "hard" bookmarks (ones it is confident in) and "soft" bookmarks. An interface could be offered whereby viewers could be offered a choice of being very careful in their surfing by jumping through all the soft bookmarks, or a bit more relaxed and only deal with hard ones.

Training

The system could be trained to adaptively produce (better) auto-generated bookmarks, by looking, over time, for correlation between known accurate segment markers (generated by hand or other accurate means) and those deduced though the means discussed above. The knowledge gained in this learning process would be used to update the Bayesian probabilities.

System-Created Text

NLPEs can identify key words in the text. These could be assembled to form very cryptic slugs that would fit on a TV screen. They might form a sentence if there was room on the display (George Bush in China), or the slug might just be a list of key words (Bush China). The screen display could be set up so that the user could hit the right button once at a particular slug to see a sentence that scrolled off the screen, or could hit a button to access a longer descriptive piece about a story.

Abbreviations: The system would keep a large library of common abbreviations and use these when needed in the slugs or other descriptive text to save space. This feature could be turned on or off by the user. Locating the cursor on an abbreviated word, and selecting it, would present the whole word. Alternatively, a viewer could go to an index of abbreviations.

Auto-generated bookmarks could be created on a customized basis for each viewer. Some of this computation could be done on the client or the customization could occur by customizing the presentation of bookmarks created by a central system.

Preference setting by each viewer would customize the presentation in a number of ways. The user could input levels of "hardness", the density of bookmarks, and the maximum or minimum length of segments desired. The viewer might also be aware of the level of "maturity" of bookmarks—that is the number of previous viewers upon which the deduced bookmarks are based. Have the bookmarks stopped "moving"? The viewer could also input keywords that would signify extra interest.

Alternatively, the system could deduce these parameters (desired density, for instance) or keywords on a viewer-by-viewer basis. If a user continually skipped out of a segment shortly after landing each time, the system might deduce that the user was not that interested in the content and therefore reduce the density of presented bookmarks.

If the system deduced a keyword for a user, it could then find the closest bookmark with which to demarcate it. For instance, if a keyword is found, the system might lower its threshold of tolerance for creating a bookmark thus allowing one to appear shortly before the word. In this manner if the user is surfing rapidly through the content, they will be sure to catch that segment close to the relevant point. The keyword could be displayed on the screen as well. These bookmark parameters could be displayed to viewers as they watched as visual icons on the periphery of the screen. In this way, viewers would be reminded of the information with which they could be navigating. It would also teach viewers what the unseen metadata was and encourage its use. Viewers would also be made aware of whether they were navigating with NLPE-derived markups or behavior-based deduced bookmarks.

User-Controlled Settings

Errors. An NLPE will never do a perfect job. It will sometimes generate markups that shouldn't be there (false positives) and at other times, miss breaks that do should be there (false negatives). Some users might have a preference for one or the other type of error. As such, viewers could have the option of setting a control that modulates the Bayesian statistical analysis tool such that one type of error or another was favored. (It is a bit of a zero-sum-game—trying to minimize one type of error will increase occurrences of the other.)

User Selectable Lead Ins. Errors will also be made in finding the exact beginning and ends of segments. If the system tries to hit the spot exactly, it might often cut off some of pertinent material. This could be annoying and make the viewer have to scroll back to find the true beginning. Consequently, and end-marking bookmark may be delayed to add extra material to each identified just to "be on the long side". We envision having the user be able to modulate this type of error trade-off as well, as discussed above for marker error.

User Selectable Segment Types. The preferred system would let users indicate preferences for certain segment types. For instance, a sports fan might indicate a preference for jump balls (recognized by a whistle and characteristic picture composition), or applause lines on the Letterman show. This preference information is more form-based than content-based, the usual parameter used for personalizing.

Using Bookmarks

Save Button. With this button, a user could take a segment associated with a bookmark (e.g., the programming between one bookmark and the next) as stored at 151 and drop it into a "scrapbook" or vault at 153. This scrapbook could have a specific amount of storage space at 153 allocated to it. This storage space might be actual hard drive space on a viewer's PVR or shared storage on a network. In the case of the shared storage, the viewer's "ownership" of the stored content would indicated by metadata that associated that network-stored content with that viewer. Items dropped into the space could be assigned permanent or temporary storage. By default, segments would be sorted by, and assigned a label from, the show from which they came. The user could tag the segment with additional tag via voice input, a keyboard, or by selecting from a menu. (Each show would have menus of clip-types that made sense for that show—pass plays, tackles, runs, etc. for football). The segments in the scrapbook could be sorted by category bucket and or segment type. In addition, a user-operated "Scissors" tool could be used to clip off unwanted content. Playlists could be setup and segments could be sorted by type or by time, etc. Furthermore, the video scrapbook could be implemented by having the users do both cuts to define the segment. In this way, they won't rely on metadata to automatically copy the piece out of the stream, although they could use the metadata to navigate to the desired point at which to cut.

Scanning Playback. One playback tool that is not necessarily associated with automated markup may be thought of as a "scan mode," similar to that found in radios. In radios, scan will jump from channel to channel, giving you a sample of each. In an equivalent PVR feature, the TV could play short segments of each segment and then go to the next one if the viewer doesn't hit a Play button. This feature would be best applied where the chance of the user wanting to see a particular piece is low and it's too tedious to keep hitting the Next button.

"Sweet Spot" Surfing. A NLPE would be able to find the heart of a story. Currently this technology is used to summarize a newspaper article for instance. In our application, the NLPE would identify the key segment of a news story or other segment. This would be the "sweet spot" of a segment. Our editors could also demarcate these sweet spots. Alternatively, they could be deduced by watching where our viewers put their systems into slow motion, or replayed the content. Sweet spot surfing could be a way to let users get right to the juicy part of each segment, without necessarily starting at the very beginning of the logical segment. It could be the spot that a viewer jumped to when hitting the Next button or employing the Scan button (see below).

Sweet spots could also be deduced by analyzing navigation patterns produced by other viewers. These would be the portions of segments never fast-forwarded. In this model of sweet-spot surfing, the system would set the bookmark at the beginning of this section and let viewers land right in the middle of the larger section.

Segment Filters. The idea here is to treat ads or other repeatable segments of content as recordable scrapbook items. These segments could be fingerprinted and have a duration associated with them. When the PVR spotted an ad or other particular type of repeated segment, it would back up to the beginning of the segment and go to the end and demarcate the segment. These bookmarks could be loaded into the system for viewer use.

These segments could also be treated through a rules-based system assuming that they are ads. For instance, the rules might say that any ad that the viewer has seen "X" number of times, be deleted, or automatically skipped on playback, etc. In some cases, for instance with an ad-supported modality, the user might have to watch a segment of it before being allowed to continue on.

Features similar to Never Again and the Huntlist described in the above-identified previously filed applications could be set up. The Never Again feature is a personalized list of segments, which the user does not wish to see again. This list can be stored on the client or on the network. The user could add a segment to the list during viewing by a command or could construct the list during a non-viewing session. The Huntlist is a similar sort of list, personalized by viewer and constructed in a similar manner. In this case, however, an item on the Huntlist would be given special status and highlighted in certain ways to bring it to the attention of the viewer. It could even be automatically saved for that viewer. The user would go to a database and request the system pull down Budweiser ads. Our system would then download fingerprints for those ads to the client PVR to be used to hunt for the relevant clips.

Other ways to identify ads would be to look for scrolling text, 800 numbers, and abrupt change in the frequency of scene changes. In other cases, the "scene format" may suddenly go away. For instance, the Fox scoreboard in the upper left, or part of the Bloomberg information matrix may go away to make room for the ad. If it were a baseball game, scene recognition techniques could use a database of shots of infields, hitters, etc. to detect that the game was still showing. If it is a news show, there may not be a talking head in the picture. A database of newscaster facial images or voices could be maintained for each show, and if someone not from the list is deemed to be present, this fact could indicate an ad. Similarly, a database of products commonly advertised, may be maintained and used to determine if advertising was being viewed or not. In addition, an algorithm detecting the excitement level in a voice or other tonal quality might indicate it was not a newscaster, or even an interviewee. Ads might also have people speaking quicker. And currently, a lot of ads don't have closed caption text. Any number of these clues may be used in combination with Bayesian techniques to determine the probability of an ad break.

Note, that some clues posit the location of a break point (switching of speakers, for instance) without knowing if there is a change in subject matter, whereas other clues indicate the presence of an ad (mention of a product name, for instance) without knowing where the break is. By combining both types of information, the content may be both segmented and categorized. This technique of combining content information with segmenting clues may be used for other types of content besides ads.

Reminder System. An NLPE could also detect when a station was promoting future items, segments, or stories. "Next week, we'll be looking at", would be one example. When these were detected, the user could be presented with an option of having a reminder sent to him to watch it. For live viewing, a reminder could be sent via email or displayed on the TV at some time before or during the playing of this segment (or the show itself as the promotion by the station probably wouldn't specify the exact time during the show). Alternatively, the system could automatically record the upcoming show. It would bookmark the show segment if it could be located by text analysis and display a reminder that it had been recorded and located on a program guide.

Sharing Locally Created or Edited Metadata with Other Users

Note that, when metadata is placed in an addressable location, other users may retrieve it on a peer-to-peer basis. In this arrangement, a user might be simply supplied with a list of URLs at which other users having similar backgrounds, or viewers who were known and trusted, could post reviewable metadata. In this way, a user could affirmatively recommend certain programming and affirmatively discourage other users from viewing other programming.

Similarly, one user could bookmark an individual program or a segment of a program, associate a recommendation or comment with the bookmarked content, and make the program or program segment identification data and the comment or recommendation available to a special interest group or to a specific individual. In order to distribute metadata to designated users, it may be structured to include addressee data which specifies individuals or groups, so that bookmarking metadata of this kind can be affirmatively pushed to targeted users, or pulled by users who request metadata contributed for their specific attention, or for the attention of a group to which they belong.

Using the facilities of an interactive digital cable television networks, a viewer could be watching a show live and want to recommend it to another friend. Using a remote control, the user could select one or more friends from a preset displayed list and then transmit to those designated persons a "watch this" message that might be displayed as close-captioned text on the friend's screen. Properly programmed, the receiver could provide the option to open a window on the TV screen for a PIP ("picture-in-picture") display of the recommended show. Alternatively, using the Internet, a message could be sent via an instant bookmarking messaging connection or by email to a designated person or persons.

Bookmarking metadata might also be transmitted to programmable VCRs and digital PVRs to automatically initiate the recording of designated programs or program segments while, at the same time, advisory messages from the metadata sender to the target viewer could be sent to notify the recipient that selected programming had been recorded for their benefit. Such a system for remotely controlling a designated receiver would include a security firewall so that only authorized senders would be able to access and program the recorder. In addition, when recording space was limited on the target recorder, an appropriate algorithm would be used to prioritize the importance of someone else's recording suggestion so that important existing recordings were not overwritten and space was conserved for future programming having a higher priority.

Note that the use of such a "Watch This" bookmark messaging facility is not limited to live broadcast material. Through the use of a predetermined program identification system, either based on a source-plus-broadcast-time identifier, or a unique program identifier, or a signature-plus-time-offset designation, someone viewing a previously recorded program could also send a bookmarking message to one or more persons recommending content which may (or may not) be available to the recipient either in recorded form or in a future broadcast. The receiver of these recommendations would have the option to forego privacy and permit the message sender to access metadata (e.g. at 133 in FIG. 1) to determine in advance whether the recommended programming was available to the recipient.

Metadata in the store 133 at the user's location which identifies previously recorded and locally available programming content (in one or more of the content storage units 143, 147, 153 or 163) may be transmitted to the user data store 117 at the remote location to select descriptive metadata at 115 from the metadata store 113. In this way, recommendations, ratings, descriptive EPG data, and the like from both professional reviewers and from other viewers may be returned to the user as an aid to selecting programming content of interest from the available recorded materials.

When "watch this" messages of the type described above are relayed to recipients via a remote resource, they may be combined to form aggregate recommendation data, enabling any viewer to identify programming that has been most frequently recommended to others.

Although the present invention contemplates that metadata which is created at one location and made available to another location and further that this metadata relates to broadcast programming content that is independently available at both locations. Where appropriate, when content available at the location where the metadata is created is not already available at a destination location, it may be transmitted with the metadata. For example, locally created content (such as home video recordings) may be stored at the user location, described by metadata, and both the content and the metadata may be distributed. In addition, program content providers may authorize the redistribution of their content under appropriate conditions (for example, under the condition that the advertising is not deleted), in which case both the content and the metadata which was obtained from another source, or metadata created locally by a viewer, may be made available to other users. In one preferred mode, metadata stored at 133 and published by a user through a central server location or by a direct peer-to-peer connection may include the URL or identifier of the program content which may be retrieved by another user who selects in by first displaying its descriptive metadata.

Storing Content at 102, 107, 143, 147, 153 and 163

As previously noted, content programming is initially stored at 143 in a mass storage unit that may also serve as a circular buffer store to enable the user to pause, replay, and fast forward within a predetermined duration of recently received incoming broadcast programming. By using the local edit controls at 136, the user can employ metadata to identify selected program segments for inclusion in a program playback library. Metadata created by the user or the remote server, or signal processing techniques, may be used to parse the program content as broadcast into segments at 145, and further metadata may be used to select, discard or modify the programming content at 151, 161 and 171 before it is reproduced.

It should be noted that the storage units shown at 143, 147, 153 and 163 in FIG. 1 are "logical" storage units, which can be, and normally should be, implemented by single physical device or group of devices. During use, actual copies of program segments need not be copied from one logical storage location to another. Instead, the contents of the logical or "virtual" storage units 147, 153 and 163 may be defined by metadata which describes and provides pointers two program segments which are a subset of the program content stored in the "inbox storage" unit 143. Only some of the parsed program segments identified by metadata in the logical parsed segment storage unit 147 are selected for potential playback by the user and placed in logical storage unit 153, and the logical contents of the virtual storage unit 153 may be modified (by the addition or deletion of advertising, for example) and placed in the virtual storage unit 163. When program data is logically transferred form storage unit 143 to 147, and then from unit 147 to unit 153, it becomes increasingly insulated from destruction. In general, content, which has not been selected by the parsing process at 145, is eligible to be overwritten, as are parsed program segments, which are "discarded" at step 151. In fact, unparsed and discarded content is not actually overwritten until additional space is required to store new incoming broadcast content.

Note also that, as long as program content contiguous to any program segment stored in virtual storage units 147, 153 and 163 has not been overwritten, the start and end boundaries of these virtually stored segments may be modified since the location and extent of each such program segment is defined by metadata and not by separate storage. In a similar fashion, the storage unit 107 at the server is preferably a virtual store whose logical contents are defined by metadata, which specifies programming content stored in the input store 103. As described later in connection with playlists, if a user is viewing or listening to a given program segment, he or she may issue command to "continue playing" a given segment beyond its end boundary, enabling the context of a segment to be reviewed. In the same way, content which continues to be available in the "inbox" storage 143 before the start boundary indicated for the program segment may be reviewed as well on request.

The system may capture more than one copy of a given program segment (e.g. song) if desired. Multiple copies may be compared in order to create a better single copy. For example, two or more copies can be "averaged" to accentuate shared components and suppress noise or talkover components existing on only one recording. After duplicates are processed, the extra copies may be discarded to save storage space. In addition, editing facilities at 135 permit the editor to readily compare the two copies of a given program segment select the better of the two for inclusion in the program library. The user may also rate the quality of a particular program segment, or the quality of programming available from a particular source, to facilitate the elimination of less desirable duplicates.

When Community Markup (CM) is used to enable users to share metadata and program quality ratings, an automatic search may be performed for best of several copies. With a community markup scheme, metadata, including song quality, is stored at the central server at 113, or shared among users on a peer-to-peer basis. For example, such community-generated metadata may accordingly be used to determine if the quality of a new copy is better than a previously recorded copy in a personal library. Thus, a previously recorded copy having a reduced rating due to DJ talkover could be automatically replaced by a recently received higher rated copy.

A user might collect hundreds of program segments with just a few days of recording of broadcast materials. Cleaning out the "inbox storage" at 143 and selectively deleting unwanted songs, even if there are duplicates would require a prohibitive effort by the user. Therefore, any method of helping the user make a decision quickly about the desirability of a song would help this process. To this end, the server could make available thumbnail summaries or short snippets of each program segment identified in the database, or the metadata could include a designation of a snippet, and these snippits could then be presented to the user to facilitate the save/delete selection process.

The availability of snippet identification data also enables the user to more quickly scan the program segments or songs available in the library. These snippets may be presented in succession to the user, in a fashion similar to the manner in which a car radio scans sequentially scans from station to station until interrupted. Because each snippet identifies the readily recognizable "sweet spot" of each program segment, the program segments may be readily identified by the user. The user may also manually scan from snippet to snippet by pressing a "Next" button when hands-free scanning is not desired. Either way, the user can use the recorded snippets to more readily select desired program segments during playback, or to skim through the recently deposited program segments which have been initially parsed at 145 to make quick manual select/discard decisions at 151 regarding the desirability of keeping a given program segment.

Business Models

The creation and distribution of metadata relating to broadcast programming may be sponsored by a variety of business models.

The metadata may be distributed on a subscription basis, with each user paying a fee to the metadata provider. The use of metadata may be accompanied by the presentation of advertising presented along with the programming content either by modifying the content as illustrated at 161 in FIG. 1. Advertising revenue may also be derived from the presentation of promotional material when program guide information is displayed, or when editing screens are displayed that enable users to generate comments or program recommendations. "Public" authors of metadata, which is shared with others, could be compensated on a commission basis, or could receive discounts from subscription fees in return for supplying metadata to others. For example, metadata created by a markup editor could be compensated with a pro-rated share of revenues based on how many of his or her metadata items were used compared to the total system-wide use of metadata.

Individual users may be compensated for watching advertising, and this compensation may take the form of a reduction in subscription fees or an actual payment. Note that, by using user preference data to direct advertising to those who would have the greatest interest in the specific service or product advertised, both the advertiser and the user are better served. Advertisers reach those potential customers having the greatest potential interest in the advertised material, and users need not be burdened with the presentation of advertising in which they have no interest.

When advertising that is provided as part of the content programming, or inserted into the content as noted above, the user may press an "information" button (normally used to trigger a display describing the program currently being played) to obtain additional information about the advertised product. In this way, the user identifies products and services about which he or she has a particular interest, and the advertiser is able to provide information (including the URL of an Internet resource containing detailed information), which would otherwise be unavailable to the user.

A remote control device may be used to accept positive or negative rating metadata during a program without interrupting the program. For example, the viewer may press a positive rating button on the remote control device one or more times to signal a level of recommendation, or press a negative rating button one or more times to signal a level of disapproval.

When previously parsed programming segments are being played to the user, the user can issue a request to insert a comment or annotation at any time during a segment. Then, at the end of the segments, a display screen or other prompt will appear. In this way, the playback unit can accept a comment, annotation, rating, or the like at the end of the segment. If live broadcasting is being viewed, the incoming broadcast can be recorded so that viewing can then be resumed on a time-shifted basis after the metadata is created.

During playback of segments having associated metadata, the viewer may select the manner in which the metadata is presented. For example, descriptive comments may be displayed as close-captioned text or in a separate screen window without interrupting the program display, or the metadata may be displayed at the beginning to aid the view in determining whether or not to watch the program or program segment about to be displayed.

The technique of broadcasting programs (content) for storage at the user's location and thereafter performing time-shifted playback under metadata control may be used as a primary system of program distribution by content owners (record companies, broadcasting networks and stations, etc.).

For example, radio or television programming could be broadcast in compressed and/or encrypted form for local storage, a "record selection" file of metadata may then be used to selective record programming of probable interest to the user at the user location, and the resulting programming may then be selected for inclusion in the user's program library and selected for playback under user control as described herein. The cost of programming could be financially supported in whole or in part by subscription fees, or by advertising, and users could elect the extent to which they were willing to view advertising in exchange for reduced subscription fees. Advertising segments, like programming content, may be inserted into the programming at playback time and selected based on user preferences and demographics, helping to insure that the advertising presented is relevant to the consumer and hence of more value to the advertiser and the consumer. With the consent of the copyright owners, radio and television broadcasts would enable users to purchase music singles, entire CDs, music videos and complete movies for inclusion in their personal radio and/or television program library. Program catalogs distributed in advance of the broadcast could be used to alert the user to future broadcast programming that could be recorded under metadata control at the time of broadcast distribution.

With or without pre-published catalogs and playlists, content owners and broadcasters could use a content watermarking system, or identification codes imbedded in the program as broadcast (for example, using the RDS standard) to make it possible to identify program segments regardless of the time and frequency of the broadcast. In this way, watermarking and identification code systems used for other purposes (e.g. broadcast monitoring for royalty verification, or to prevent illegal copying) could be used for the additional purpose of controlling recording and playback by licensed users under metadata control. Identification codes or watermark patterns may be included combined in huntlist and playlist metadata data with additional metadata describing the identified programs.

To promote particular songs, albums, subscription or free broadcast programming, record companies and broadcasters might distribute metadata, which presented selected segments of recorded programming in organized "previews" designed to promote individual program segments. Sample songs and programs might be made available free of charge to promote related programming, in which case mechanisms could be included minimize any possible cannibalization of program sales, but while providing introductory exposure to new programming. As such, the following features might be implemented:

1. Restricting how many songs off an individual album, or how many programs from serialized programming, could be captured.
2. Limit the duration of any preview segment.
3. Limiting the size of the "preview" library.
4. Limit the "life" (duration) that a program may be previewed, or limit the number of times a program segment (e.g. audio song or music video) can be played before it must be purchased or paid for on a use basis.
5. Charging a subscription fee for the right to view preview copies 6. Prevent preview segments from being transferred to another user.
7. Inserting advertising into previews.

Selecting and Modifying Content at the User Location

As indicated at 143-171 in FIG. 1, the metadata provided by the remote facility, or by other users, or by the local user, may control the selective recording and rearrangement of program segments to form composite programming. Thus, segments extracted from several news programs might be recorded during the day with all programming dealing with a particular topic being consolidated into a single composite program devoted to that topic. The selection of the components of such a composite program may be made at the remote location by using the preference data supplied by an individual user stored at 117, or may be done at the user location by matching locally stored preference data against program description metadata received from the other locations or locally produced descriptive metadata. Note also that such a composite program need not be constructed in advance at 161 and stored at 163 for playback, but may instead be assembled "on-the-fly" simply by selecting identified segments in the proper order from the segment store 147.

Selecting Segments for Playback at the User Location

As noted earlier, the metadata, which is available to the user, may include electronic program guide (EPG) data for displaying a listing or matrix of available programming, including both live programming and recorded programming. The user may select items from this EPG display to record or play incoming broadcasts (or both), may play previously recorded programming, or may identify future programming to be recorded.

During playback of recorded material, and during the recording of new material, a progress bar that shows the location within a program that is currently being viewed can be displayed at the user's requests, typically occupying only a portion of the screen while the video content occupies the remainder. Segment markers can be noted on the bar and associated with icons to indicate the presence of descriptive metadata. Using a mouse or remote control to "click on" or select a segment displayed on the content bar would then alternatively cause the metadata associated with that segment to be displayed, or would resume playback of content at the beginning of the selected segment. Segments as shown on the progress bar could be color coded based on a program rating to enable the user to quickly view highly rated segments, or to skip lower rated segments.

In addition, metadata about segment quality or other attributes may be displayed on the screen using suggestive icons (smiling faces, frowning faces, etc.) while a segment is being shown helping viewers to more quickly decide whether to hit the "next segment" button or a channel surfing button on a remote control unit. Icons indicating the availability of additional descriptive metadata may also be displayed on the progress bar, or associated with programs listed in a displayed program guide.

Because metadata may exist in many forms from many sources, the user may be given the opportunity to enter display preferences that control the manner in which metadata is displayed. Thus, metadata from especially trusted sources may be preempt regular programming and be provided with use of the entire screens, while other metadata may be displayed as closed captioned text or as icons, or without any display unless the view specifically requests the presentation of metadata for a particular program segment.

One of the most important mechanisms for assisting a user in locating desirable programming is the use of metadata to enhance the content and operation of the electronic program guide. Metadata indicating a user's preferences which is derived from both the preferences directly expressed by the viewer and by preferences inferred from the user's viewing and metadata creation activities may be used to selectively display and highlight particular programs in the program guide listing. Icons or highlighting may be used to identify listed programs and segments for which additional metadata is available for display to the user upon request. Metadata which ranks programs may be displayed using rating icons, color coding, or highlighting to guide the viewer toward higher rated programs.

Note that program guides may display listing of previously broadcast materials which are available in local storage, broadcast programming which will be available currently and in the future for viewing and recording, and "content on demand" programming which exists as retrievable resources on program servers and on storage maintained by other users and shared on a peer-to-peer basis with other users. Metadata describing all such programming content may be located using an electronic program guide format which permits the extensible display of additional metadata and the selection of particular program content for viewing and recording.

Playlists

The metadata, which describes individual program segments, may be combined to form an ordered playlist. As described in detail in U.S. Pat. Nos. 5,271,811, 5,732,216, and 6,199,076, and in co-pending application Ser. No. 09/782,546 filed on Feb. 13, 2001, by James D. Logan et al., by James D. Logan et al., the metadata as assembled at the server and transmitted to the user location may take the form of a playlist consisting of a scheduling file of metadata which specifies the content and schedules a default playback sequence in which that content is reproduced. At the user station, the scheduling file may be reorganized to alter the content and schedule of a playback session. As described in the foregoing patents and application, the content of the playlist may be varied in accordance with preferences associated with each user.

The metadata stored at 133 is available to the user to facilitate the selection and navigation of available program materials. The metadata may include a playlist that specifies the sequence within which program segments will be played back. Navigation controls including skip forward and skip backward controls may be used to skip the remainder of the segment being played and resume the playback at the beginning of the next segment, at the beginning of the current segment, or the beginning of the prior segment.

In addition, the user can vary the playback speed, request compressed playback where periods of silence and/or unchanging images are skipped. Playback speed can be automatically increased (both speech and video) under metadata control or by analysis of the content when the action is minimal (e.g. huddles in a football game) and slow down when the action picks up (e.g., after the football is put in play). Sequences that are candidates for rapid replay may be specified by metadata or can be determined by identifying programming when no voices are present in the audio component and minimal changes are occurring in the video image. Automatic or manual playback speed adjustments may applied independently to different program streams displayed concurrently in a split screen or in a picture-in-picture (PIP) display. As noted elsewhere, a viewer's decision to skip, speed up or slow the display of a particular segment may be used in a segment rating system as vote indicating that viewer's level of interest in that segment. In addition, such viewer actions can be used as an indication of the viewer's subject preference or disinterest in the subject matter of that segment and such decisions, on a cumulative basis, can be used to develop a preference profile used to automatically recommend or select programming for recording or playback.

Metadata may also be employed to specify a play list composed of extracts from a stored program, enabling users to view a preprogrammed preview of a given program, or to view a shortened summary of the program instead of the entirety of the program. When passages of particular interest to the viewer are presented, the user may be given the option of viewing that segment in its full context, and then switch back to the shortened version on demand. Note that a decision by a viewer to switch to the full context for a particular segment presented in a preview or summary may be taken into account as a positive rating for that segment, or as a preference indication attributable to that viewer. As noted elsewhere, the "snippets" which are viewed or listened to during playlist navigation or scanning may a highlight or "sweet spot" of the program segment which is designated by metadata.

Metadata labels may be displayed in a list, or as subtitles, to assist the user in rapidly locating desired segments for playback. A mosaic of images, each selected from a single segment, may be displayed as a visual cue to assist the viewer in locating a desired segment from a sequence of segments. When the metadata includes descriptive text, keyword searches can be performed to identify segments described with matching words.

The presentation of probable preferences, whether by icon display, highlighting particular items on a program guide listing, or the like, may be based on either a local or remote analysis comparison of the user's preference profile with the metadata that describes the segment's program content. If done remotely, icons and highlight control metadata may be sent with the program guide or programming material to directly control the user's display whereas, if the analysis is performed locally by comparing locally stored preference data with the descriptive metadata, the user's privacy may be better protected since preference information need not be transmitted outside the user's location.

The subdivision of program materials into logical segments makes it possible for a viewer to save individual program segments, and their associated descriptive metadata, into a virtual scrapbook consisting of segments tagged as saved for later viewing. If desired, a viewer may edit such a scrapbook play list to delete or crop particular segments, rearrange the sequence in which they are to be played back, and add annotations or comments. The resulting program sequence can then be persistently stored in the available local storage area, or transmitted as message containing both content and metadata to another user. The user may also be provided with the ability to record the fact that a particular program segments was found to be particularly interesting or enjoyable, thereby affirmatively recording a preference for further installments of the program and/or for other future or recorded programs having similar content. Note that the act of saving a given program or program segment into the user's scrapbook may be recorded as positive vote in that program or segment's approval ranking, and as an indication of the subject matter interests of the viewer.

Also, while viewing a particular program segment, the user may be given the option of deleting that segment from storage, deleting an entire program sequence to which that program belongs, or affirmatively recording dislike for programs of that type which can be taken into account when the preference makeup for that user is employed to automatically select, recommend, or discard different programs and program segments.

In order to create truly personalized radio or television, it is desirable to create playlists on a continuing basis. In addition, it is desirable to allow users to create their own playlists and to randomize these playlists to automate the sequence in which selected program segments are played, or to automatically play those segments in a random sequence.

The central server, or the local system, may generate playlists based on a combination of shared and personal data. The shared data may identify program segments (e.g. songs or informational segments), which go together and further indicate a preferred playback sequence for associated segments. The personal data may be based on the user data (locally available or uploaded to the server and stored at 117), which may identify which program segments are available to the user and which segments have been previously played, and when. This shared and personal data is then processed to produce a recommended personalized playlist, which is made available to automate the user's playback sessions.

In order to have the server-based playlist generation mechanism work well, it needs to know as much as possible about the user's demographics, expressed preferences, listening habits and experiences. As described in U.S. Pat. Nos. 5,271,811, 5,732,216, and 6,199,076, the content of the scheduling metadata (playlist) may determined from the weighted combination of the user's demographic characteristics, expressed subject matter preferences (e.g. particular music genres and artists), and "log file" data which identifies what, when and how the user previously played. At the time of playback, the user may also specify a positive or negative rating to the segment being played. (See also, the discussion of the negative rating "Never again" button and the positive rating "huntlist") discussed separately.

In addition, to tracking recorded program segments actually played, the log file may advantageously record the identity of live broadcast programming or programming from physical media or other sources (e.g. music or movies on compact disk, downloaded MP3 files, etc.) which is viewed or listened to.

The user may designate a preferred session length for the playlist. Thus, in a radio based system for use by commuters, the session length may be related to the average transit time to or from work. Only those program segments having the highest positive weighted rating and which, together with other high rated program, have an combined playing time that approximates the requested session length are included in the playlist.

Playlists, program guide data, and compilations from other sources may be aggregated and presented to the user. For example, the server or the user location may employ a searchable database of available program materials (e.g. songs, albums, movies, etc.), which the user may use to select a list of desired programming. This desired program list may then be used to form a huntlist for broadcast programming saved to the inbox storage at 143, to transmit to the server as user preference information, or to provide an indication of the user's subject matter preferences which can be used identify related available programming which the user may wish to view or listen to.

Additional implicit metadata regarding user preferences by may be derived by monitoring other forms of users' interaction with music. When the user change broadcast stations when viewing live broadcasting, skips a song being played from a playlist, or rejects particular program segments from a server produced catalog of available programming, a negative rating for that program segment can be inferred. Conversely, when the user plays a song or program segment multiple times, requests additional information about a program segment or artist, etc., this behavior can be interpreted as a positive indication for that program or subject. Song preference metadata of all types will be used with our Selector-type program to optimize the construction of a personal radio station. Alternatively, the data may be ported over and used by a subscription music service.

The user interface presented to a user for program library and playlist management may be designed using the interface for an email client as a metaphor. Just as email is "pushed" at the user and then sorted, read, and filed, a playlist manager presents a list of program segments that are available in the user's personal library. Programs, which have previously been played, may be identified by a distinctive type font or color. Once listened to, the style in which the program segment is listed is changed. Users may sort the program listing list by artist, program name, date and time of capture, source (e.g. radio station call letters), recording quality, user rating, and other parameters. Multiple sort fields will be allowed; for example, the listing could be sorted by source first, and then by time of capture. Any program on the list may be selected (by clicking or by entering its list number). When selected, a given program listing may be immediately played in its entirety, a "sweet spot snippet" only may be played as a preview, or the selected segment may be added to a playlist, or moved to a user-created and user-named "folder," or to a system-created folder.

Metadata which indicates the subject matter category or categories (or genre) to which a program segment belongs, or indicates the artist name, album name, or series name may be used to create an initial set of system-created folders and sub-folders for program segments. Users may move individual program segments to and from these folders and user created folders. When a request to delete a program segment in one folder is issued, and the same program segment also exists in other folders, the user may be given the option of deleting that program segments from all folders at once. A "trash" folder may hold a listing of all deleted program segments which are, in fact, retained in storage until the contents of the "trash" folder are deleted in whole or in part (in the same manner that a "trash folder" in many email clients operates). Category indicating icons, different font colors and styles, etc. may be used on any single listing to assist the user in visually selecting particular program segments.

Program segments identified in a playlist or folder may be shared with others; that is, the metadata may be transmitted to others for inclusion in their huntlists or program library if the underlying material is already available, along with a covering "forwarding memo" from the sender. Metadata may be transferred in a standard format as a MIME attachment to email, or may be shared using other forms of peer-to-peer transfer.

An application particularly suitable to video, the user might prefer an alternative to working off of a list, which could require the user to go back and forth between the list and the video screen. In this case, program listings and selection menus may be superimposed over the image, or in window or frame adjacent to the viewing area. Visual prompts, which characterize the currently viewed programming, may also be displayed. For instance, short descriptions of the program segment, a rating value, an indication of the source and time of the original broadcast, or any other information derived from the metadata may be displayed concurrently with the program.

Navigation cues can be displayed, such as a "forward arrow" shown on the screen during a low rated segment, encouraging the user to skip to the next program on the playlist. For video or audio, the user might want to have more data available at once and so multiple icons may be shown on the screen at once. By skipping to last of four forward arrows, the user might jump ahead four segments. By the form or color of the icons may indicate each corresponding segment's rating or subject matter, permitting the user to more easily directly to a desired segment. A linear map of the content of the playlist, or of the currently playing program segment, might be presented across the bottom of the screen, letting the user go right to a desired segment or scene. The user may also be given the ability to modify the playlist by highlighting programming to be skipped. In addition to skipping or deleting segments (negative actions) another user interaction could be to "seek" or find similar segments immediately, or a request to include such similar segments on the user's hunt-list. In addition, the user may elect to "continue" playing a given segment beyond the end boundary indicated by the metadata for that segment, or to review program material broadcast before the start boundary for that segment.

With a handheld device, the user could hold the skip button down for an extended time and that action would delete or skip over all segments similar or associated with that segment. Attributes could be on the screen that the user could click that would preface the second action of deleting or finding etc. In addition to deleting non-qualifying segments, the system could rearrange segments. Again, this could be done with varying levels of user involvement, reaffirming the feature each time or setting a preference for rearrangement once. In a more automatic system, the user could re-select preferences each session. The segments would be compared against these preferences and non-qualifying segments cancelled. More automatic, would just be a reaffirmation of existing preferences.

Playlist control is not limited to specifying recorded segments. For example, a commuter may wish to listen to a program of recorded music from a playlist, but further specify that the recorded playback is to be interrupted at predetermined times to permit the user to listen to a favorite scheduled news, weather or traffic report as a live broadcast. In this case, the playlist includes the designation of both live and recorded programming and dynamically alters the playlist so that live programming can be played at its broadcast time. Because the playlist can control the tuner or tuners, the user can be presented with a hands-free combination of selected live and pre-recorded programming. To assemble such a playlist, the metadata provided from the server includes program guide data for future programming. To the extent such programming is serialized, the user may request that a given live program segment be dynamically included in any playlist, thus effectively "interrupting" scheduled recorded programming to bring the user each pre-selected live broadcast.

Advertising Preservation

It may be important to prevent the user from skipping the advertising, which provides financial support to the broadcaster and others. To this end, segment start and end marks may be placed in such a way that the advertising, which supports a segment, is always included in the segment. The advertising could also be placed in a "skip protection" zone. For example, if a program segment was supported by advertising content at both the beginning and end of the segment, an attempt to skip the advertising played at the beginning of the segment would cause the player to skip to the beginning of the next segment (thus preventing the user from playing the content without first listening to the leading advertising segment. Any attempt to skip the advertising at the end of the segment would simply be ignored.

In the community markup system, editors contributing markup would be prohibited from placing skip marks in a fashion that would permit advertising to be skipped without also skipping the supported content.

Selecting Program Sources

A user typically has many different broadcast stations to choose from, and recording all broadcasts from all stations would exhaust, or at least misuse, local system resources. Accordingly, it is desirable to provide mechanisms for automating or assisting the user in the selection of program sources to record. Typically, this selection is made based on both frequency and time; that is, selecting different frequency channels at different times to capture programming of the greatest interest to the user.

Because the server typically has a database which indicates what program segments were broadcast by what stations over a time interval of recent days or weeks, and because the server further has available to it information from the user containing user preference information, including requests for particular programs, for particular series of programs, for particular subject matter categories or genres, for particular artists, and the like, it is possible to match the user preferences against the broadcast histories of those sources which are accessible to the user and provide the user with data indicating which stations are most likely to broadcast subject matter of interest to the user, and a what times. Since the user typically has only one or a few tuners available, and/or a limited capability to record plural programs at the same time, and limited storage space, predictive tuning may be applied to increase the likelihood that programming will be captured which best fits the user's preferences.

Thus, the user's huntlist of desired programs, together with preference information which is expressly provided by the user or implied for the user's prior selection history, is used to develop a recording schedule file which identifies particular stations and the times of day when those stations typically broadcast programming of interest to that viewer. This recording scheduling file of metadata is then downloaded from the server to the client location and used to control the selection of program material received and stored in the inbox storage 143. Alternatively, the recording schedule file may be used to recommend a recording schedule to the user, thus alerting the user to desirable recording opportunities that might otherwise be overlooked. For example, the recording schedule file may be used to highlight sections of an electronic program guide to assist the user in making informed selections of particular programs of interest. When a recording selection file is used to automate the recording process (typically without requiring the attention of the user), the content of that file may be transmitted to the server so that the server can then return a program segment identification file which identifies the content of the programming recorded, and permits individual recorded segments to be selected by the user, or automatically compared with the user's huntlist to select desired programming for inclusion in the user's library.

The "record selection file" may also be used to provide "hands free" automated tuning of live radio broadcasts. The record selection file developed based on the broadcast history of available stations and on the user's preferences may be used to supplement a listing identifying those programs which are specifically requested, with the result that the system makes an informed "guess" about the station most likely to broadcast live programming of interest. Normally, however, it will be preferable to allow the system to record programming in advance to create a library of program segments which are of know interest to the user, and then to insert these programs on a time shifted basis between specific live broadcasts identified by the user.

Live and time shifted broadcast programming may be organized by genre, permitting the user to select a specific type of programming. For example, the station selection push buttons in a car radio might be associated with different kinds of programming: a "news" button would play the most recent news broadcast from the beginning on a time shifted basis; a "traffic" button would play the most recent traffic report; and "classical," "jazz" and "alternative" buttons would play back recently recorded music in each specified genre. The user would pre-assign the kind of programming desired, and a "record selection" list calculated to capture desired programming in each category would be provided to the user. Programming which is time sensitive (traffic reports having a high priority, news programming a medium priority, and music having a low priority) would take precedence to insure that recently broadcast information is always available.

A Personal Video Recorder Implementation

Figure 2:
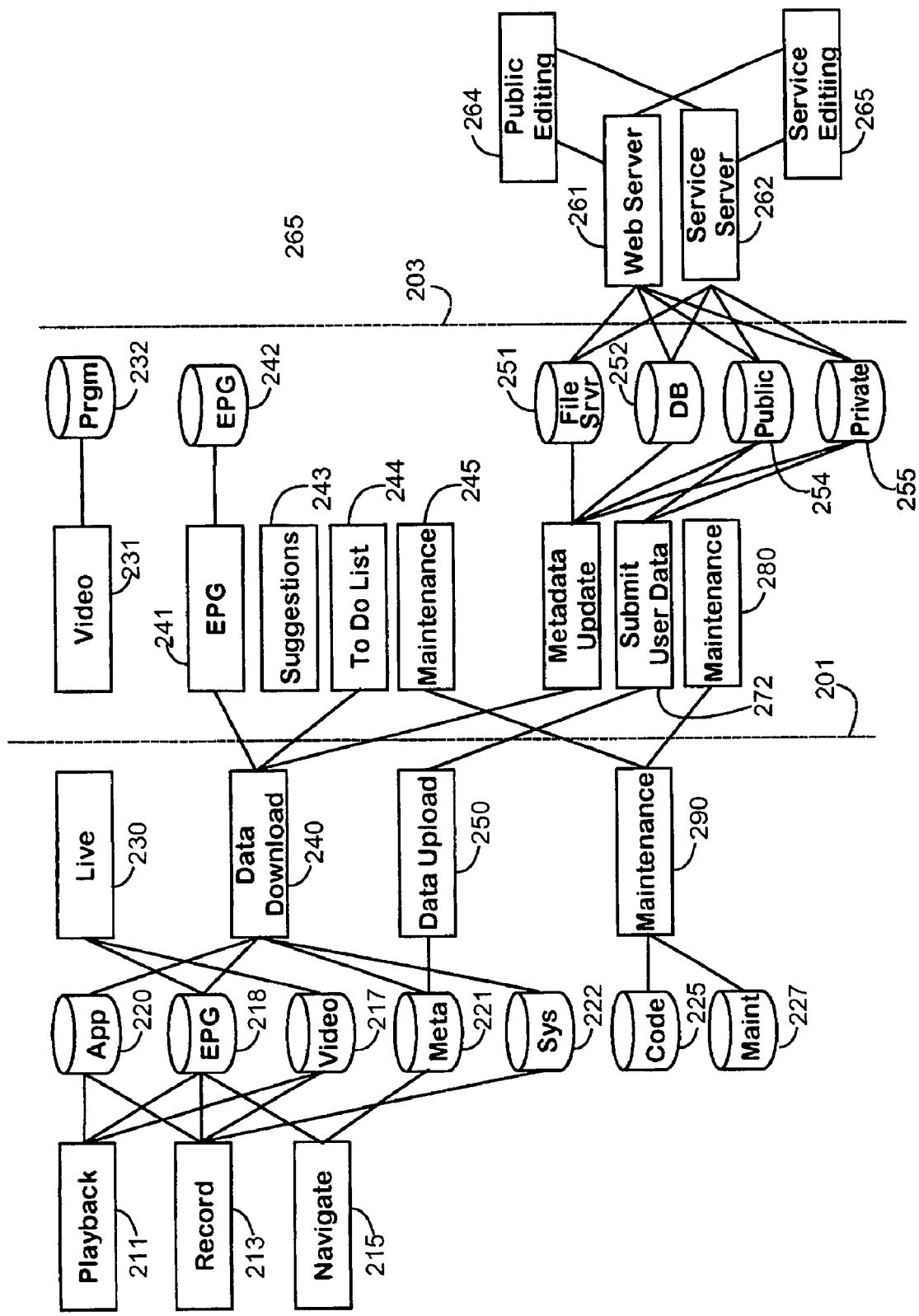
FIG. 2 is a data flow diagram illustrating the manner in which video program content and descriptive metadata is transferred between content and service providers and a personal video recording device operated by a viewer in accordance with the invention.

FIG. 2 of the drawings shows the principal data flow paths in a preferred implementation of the present invention which extends the capabilities of a personal video recorder "PVR" (also called a digital video recorder "DVR"). The invention may also be implemented using a Network Personal Video Recorder (NPVR) in which video programming is stored at a network node and fed to the client device on demand, with pause, replay, fast-forwarding controls being provided to the viewer simulating the capabilities provided using a PVR's local storage. As shown in FIG. 2, the PVR performs the data storage and manipulation functions shown at the left of the vertical dashed line 201. Remote data storage and manipulation services are performed as shown in the middle of FIG. 2 between the vertical line 201 and a second vertical line 203. These services may also be accessed by additional client devices as shown at the right of the dashed line 203.

The PVR includes a processor for executing programs which performing data storage retrieval and for controlling the display, recording and playback of video programming using integrated electronic program guides. See, for example, the ReplayTV PVR described in U.S. Pat. No. 6,324,338 issued Nov. 27, 2001 entitled "Video data recorder with integrated channel guides" and the TiVo PVR described in U.S. Pat. No. 6,215,526 issued on Apr. 10, 2001 entitled "Analog video tagging and encoding system." Controls for pausing, replaying, and fast-forwarding time-shifted television programming stored in a digital circular buffer are described in U.S. Reissue Patent 36,801 issued on Aug. 1, 2000 entitled "Time-delayed video system using concurrent recording and playback." In each of these arrangements, a programmed processor controls the recording and playback of video programming which is stored in digital form on a conventional hard disk drive. PVRs are increasingly being incorporated into the set-top-boxes (channel converters) provided by satellite and cable programming providers and utilize the electronic program guide provided by those services. The functional equivalent of the local program storage provided by a PVR may be achieved by video on demand (VOD) services which store program material at network nodes near subscriber sets and download selected programming over a broadband connection upon the request of the viewer or in anticipation of the viewer's probable future program selections.

As described in more detail below, the PVR is provided with controls that may be manipulated by the viewer, typically in the form of a remote control device coupled to the PVR by a wireless or infrared communications link. These interface controls typically operate in conjunction with the television screen display which provides menus, prompts and other visual displays to aid the viewer in performing three types of control functions: playback control as seen at 211, recording control as shown at 213 and content navigation as indicated at 215.

The playback control 211 controls the playback of stored video programming seen at 217, stored electronic program guide (EPG) data seen at 218, application data such as standard templates stored at 220, metadata describing programs and program segments stored at 221, and other system control data stored at 222.

The recording control 213 permits the viewer to utilize the EPG data 218 and the metadata 221 to control the recording of available content in the local video store at 217.

The PVR further includes storage at 225 for storing executable application program code and storage at 227 for maintenance information, usage data, etc.

The locally stored video and EPG data seen at 217 and 218 respectively in FIG. 2 are supplied from the live video source 230, typically a connection to a satellite or cable television provider ("MSO"), a conventional broadcast tuner, or some other video programming source indicated 231 which supplies programming and program guide content 232.

The application data 220, the EPG data 218, the metadata stored at 221, and the system data 222 may be downloaded via a data connection seen at 240, which may be the same physical communications link that supplies the live video feed 230, or a separate data link such as an Internet or dialup connection. The data download feed 240 is may be provided in part by a PVR support service which supplies EPG data 241 from an available EPG database 242 and a database for storing programming suggestions 243 provided by the PVR service. In addition, the PVR service may provide information such as the "To Do List" 244 to assist the viewer to perform certain tasks, and to control the PVR's performance of automated tasks such as recording selected programs identified by the PVR service.

Metadata stored at 221 in the PVR, and additional EPG, application and system data stored in the PVR at 218, 220 and 222 may be downloaded via the download connection 240 from the metadata service provider which provides a metadata update facility at 250. This facility is coupled to a file server 251 and/or a database server 252 for storing metadata including data describing individual program segments, playlists, huntlists, etc.

In addition, metadata contributed by other users and stored in a public database 254 as well as private metadata from a database 255 may be downloaded to the PVR by the metadata service's download facility 250. The metadata stored at 251-255 may be created, edited and deleted using a Web server 261 or other server 262 operated by the metadata service to permit the public (other viewers) to contribute to the metadata as illustrated at 264, as well as providing the ability for employees of the metadata service to create and modify the stored metadata as indicated at 265. Using the PVRs data upload facility seen at 250, usage data, "watch this" selections, playlists, and other user-generated metadata may be uploaded from the PVR via the user data submission facility 272 provided by the metadata service which may supply both the public and private metadata stores 254 and 255.

The executable program code stored in the PVR at 225 and the maintenance data stored at 227 may be updated through a maintenance data link 280 which receives program code and maintenance data downloaded from either the PVR service at 245 or from the metadata service provider as seen at 290.

The video program storage seen at 217 in FIG. 1 may be subdivided into virtual storage areas corresponding to the storage 143, 147, 153 and 163 described above in connection with FIG. 1. The metadata storage shown at 221 in FIG. 2 corresponds to the metadata storage shown at 133 in FIG. 1.

Although separate storage areas are shown in FIG. 2 for storing application data, EPG data, video date, metadata, executable code, etc., it will be understood that all such data may be persistently stored on the PVRs hard disk from which it is loaded into RAM storage for use as needed.

The Viewer Interface

Figure 3:
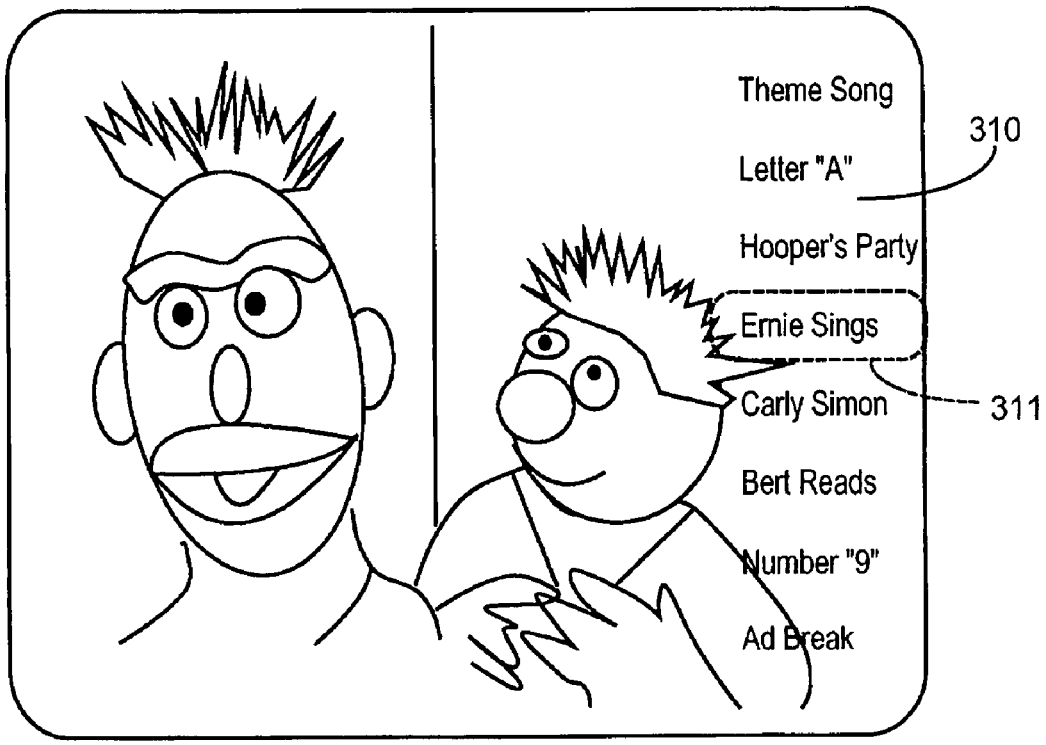
FIGS. 3-5 illustrate screen layout displays illustrating the manner in which program segment guides are displayed to enable the user to interactively control program segment playback as defined by playlist metadata.

The interface presented to the viewer by the extended-capability PVR shown in FIG. 2 preferably displays an on-screen program segment index of the type shown at 310 in FIG. 3. The index 310 transparently overlays the content of the normal programming whenever a "segment guide" button is pressed on the remote control unit, or selected from a menu of other options. Alternatively, when the segment guide is launched, the portion of the display showing content is shrunk as shown at 405 in FIG. 4, providing room at the right for an index list of segment labels at 410 and an "information pane at 412 below the content window 405.

The segment index displayed is normally a subset of the total playlist for a given show which includes the label or "bookmark" for the segment currently playing.

The index, a vertical list of the program's segments displayed on the left or right side of the video image, with the beginning segments at the top, provides an easily understood guide to the content of the program currently being viewed. When the segment index is displayed, the currently playing segment is highlighted as shown at 311 in FIG. 3 and at 411 in FIG. 4. The index can be easily taken off the screen with a click of the remote (using the "segment guide" button to toggle the guide ON and OFF).

The index comprises a list of "slugs," brief two to five word long descriptions of each segment. In general, the length of slugs will be relatively short. When a high resolution screen is available, the viewer may be offered the option of displaying more detailed text descriptions. Regardless of screen size, at times even short descriptions could trail off the screen, but the view may use the cursor buttons on the remote to scroll the text of the index sideways. Alternatively, a wider horizontal space may be provided to display the descriptive text for the currently selected segment ("selected" meaning either the segment label (called a "slug") that describes the segment that is playing or a different one being "pointed" to in response to the viewer's movement of the highlighting using the remote's UP and Down cursor buttons). This wider text for a selected label in the index listing could be the same as, or different from, the information shown in the information pane 412 for the highlighted segment as the highlighting changes.

Example Show Playlists

Two example show playlists appear below, the first for a CNN news broadcast and the second for an episode of "ER." In both cases, only the start time, end time, the brief "slug" description and the longer "detail description" of each segment is shown, with additional attribute data omitted:

Example CNN Playlist

| Start Time | End time | Slug | Detail Description |
| --- | --- | --- | --- |
| 00:10:000 | 02:49:000 | Campaign Reform | Campaign finance reform bill in Senate |
| 02:52:000 | 03:19:000 | McVeigh Ruling | McVeigh requests not to be autopsied |
| 03:22:000 | 03:49:000 | Papa John's | Papa John's vs. Pizza Hut |
| 03:51:000 | 04:53:000 | Energy Crisis | California faces rolling blackouts |

| Start Time | End time | Slug | Detail Description |
| --- | --- | --- | --- |
| 04:54:000 | 05:19:000 | Mid-East Peace | Israeli Minister meets with President |
| 05:20:000 | 05:44:000 | US/Japan Meet | Bush meets Japanese Prime Minister |
| 05:45:000 | 06:11:000 | Submarine News | Sailor to testify about accident |
| 06:12:000 | 08:17:000 | Foot & Mouth | Brit farmers balk at animal killings |
| 08:18:000 | 09:40:000 | Weather | Extended national forecast |
| 09:41:000 | 10:03:000 | Buddah Destruction | Ancient Buddhist statues destroyed |
| 10:04:000 | 10:34:000 | Super Aspirin? | Plavlix findings |
| 10:35:000 | 10:58:000 | Space Station | Mir continues in orbit, delayed fall |
| 11:00:000 | 12:27:000 | Your Health | Mediterranean diet |
| 12:28:000 | 13:27:000 | Commercial 1 | Office Depot commercial |
| 13:28:000 | 13:58:000 | Commercial 2 | Shell commercial |
| 14:00:000 | 14:48:000 | Top Stories | Power crisis, campaign reform, McVeigh |
| 14:49:000 | 15:08:000 | Wall Street | Dow, Nasdaq, S&P reports |
| 15:09:000 | 15:18:000 | Dollars & Sense | Waiting on federal reserve |
| 15:19:000 | 16:01:000 | Interest Rates | Federal Reserve rate cut analysis |
| 16:02:000 | 16:23:000 | Cholesterol Drug | Pfizer has competitor |

Example ER Playlist

| Start Time | End time | Slug Segment | Description |
| --- | --- | --- | --- |
| 00:00:00:893 | 00:02:17:849 | Opening Act | Pigeons invade the ER |
| 00:02:17:849 | 00:03:07:757 | Opening Credits | Show theme and credits |
| 00:03:07:757 | 00:03:39:201 | (C)Francesco Rinaldi | The ultimate spaghetti sauce |
| 00:03:39:201 | 00:03:54:105 | (C)J C Penny | Go on a shopping spree! |
| 00:03:54:105 | 00:04:24:229 | (C)Sprint PCS | Special cell phone promotion |
| 00:04:24:229 | 00:04:39:659 | (C)Maxwell House | Good to the last drop |
| 00:04:39:659 | 00:05:09:060 | (C)Mazda Sports Car | 2001 Mazda Protege features |
| 00:05:09:060 | 00:06:11:587 | (C)NBC Promo | Promotion for Dateline |
| 00:06:11:587 | 00:13:55:633 | Act 1 | Beauties hurt in salon explosion |
| 00:13:55:633 | 00:14:56:132 | (C)Office Depot | Office Depot |
| 00:14:56:132 | 00:15:11:086 | (C)Milka | Chocolate Milka - Little Scoops |
| 00:15:11:086 | 00:15:41:252 | (C)Saturn 2001 | Saturn SC1 |
| 00:15:41:252 | 00:15:57:176 | (C)J C Penny | Go on a shopping spree! |
| 00:15:57:176 | 00:16:26:674 | (C)Charles Schwab | IRA - starring golfers |
| 00:16:26:674 | 00:16:56:117 | (C)AT&T Wireless | AT&T - Customer Advantage |
| 00:16:56:375 | 00:17:06:107 | (C)PGA Tour | PGA Tour - Tiger Woods |
| 00:17:06:107 | 00:17:38:048 | (C)The Weakest Link | New game show promotion |
| 00:17:38:048 | 00:28:24:255 | Act 2 | Benson still can't find a job |
| 00:28:24:255 | 00:28:54:126 | (C)Honda Civic | All new 2001 Civic |
| 00:28:54:126 | 00:29:08:904 | (C)Crouching Tiger | Crouching Tiger - Hidden Dragon |

Figure 4:
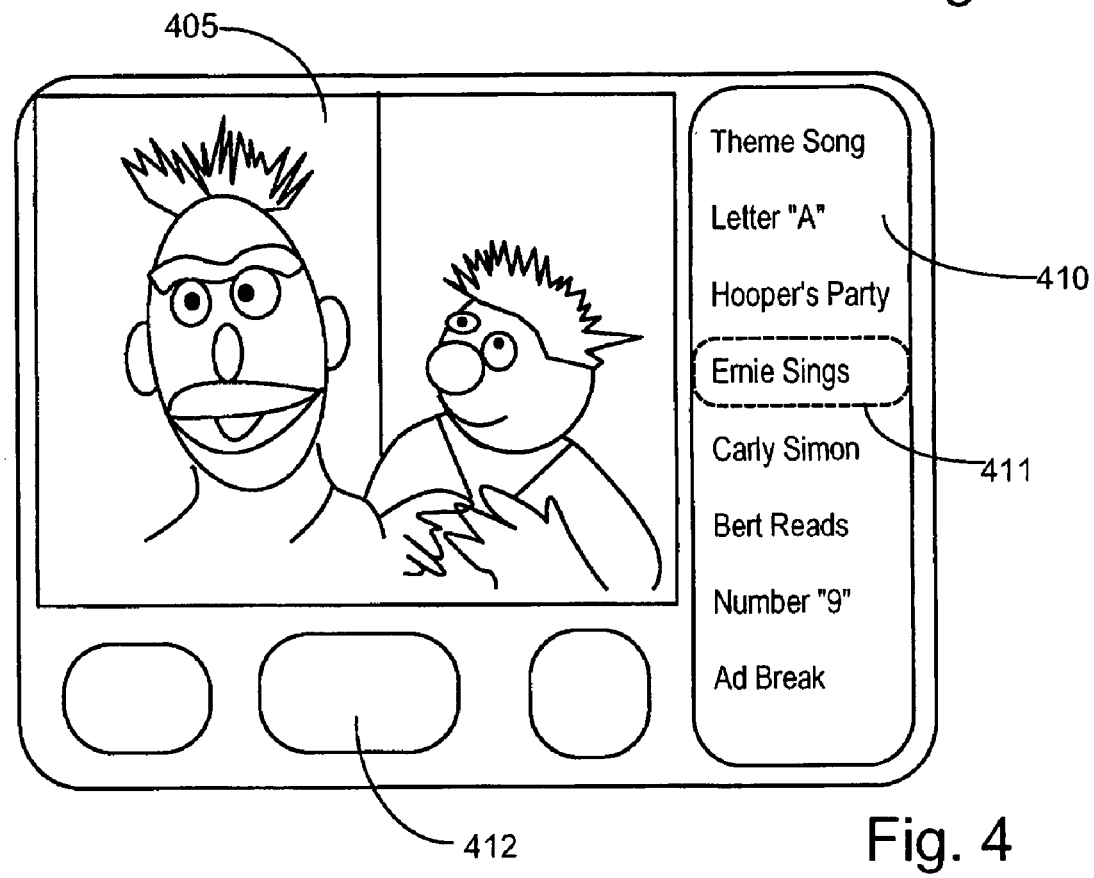

In the display shown in FIG. 4, the video picture is shrunk to provide an empty area for the index in on the side, resulting in extra space in the vertical dimension that is used for a multiple-function information pane 412. This space may be used for a variety of things, including displaying a more detailed description of the highlighted segment, or for displaying advertising. The additional information about the selected or playing segment may include a short synopsis or web links associated with the content as illustrated at 510 in FIG. 5.

Advertisements displayed in the information pane 412 may be selected based on the content of the then-selected segment. For instance, an advertisement could be displayed at 412 for a video on demand (VOD) movie related to the topic in the then-playing segment. These ads could also be interactive, allowing a viewer to "click on" the ad to play a recorded full-motion promotional video, or to link to a web site using the data download facility 240, while the previously playing program was paused (that is, concurrently recorded for later time-shifted viewing if desired). The advertising displayed in the information pane 412 may also be personalized to each household, or to the current viewer, by using stored preference or demographic data to select advertisements which are more likely to be of interest to the particular household or viewer. A combination of content monitoring and viewer/household preference data may be used to select the advertisement displayed.

The index list of program segments may include one or more additional levels of nested subindexes. For example, the segment label "Ad break" at the bottom of the index shown in FIGS. 3 and 4 might be presented as shown below:
Ad Break
    Wheaties
    Zoom Preview
    Space Ranger
    Ball Park Franks The subindex, called a "twistie," would offer viewers the opportunity to access a finer division of the show when desired, while preserving screen real estate when not needed. The twistie hierarchy could have two, three or more levels of detail. When the playback of the program arrives at the location in the video represented by a twistie, or when the viewer scrolls down to that point with the remote pointer, the twistie can automatically open up to show the detail about the content at that point in the program. Alternatively, the twistie could open up after the viewer inputs a specific signal with the remote to do so.

Figure 5:
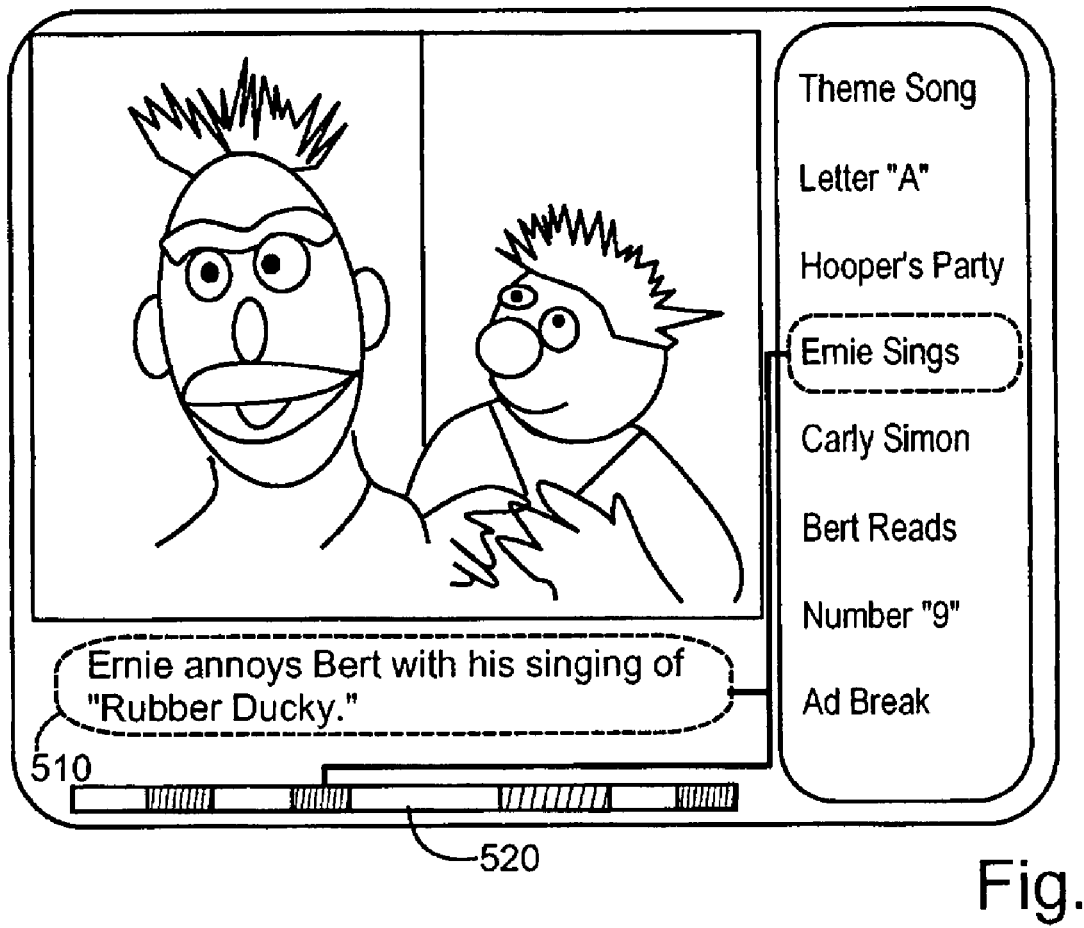

Independent of the length of each segment being shown, a visual display might display the length of the entire program as a time bar as illustrated at 520 in FIG. 5, running either vertically or horizontally across the screen. This time bar could have markers indicating the locations, and end markers, for each segment. An indicator on the time bar, such as the line 522 connected to the highlighted, currently playing or selected slug "Ernie Sings," would show viewers the location of the currently playing or selected content. For playlists that contained only a subset of all segments, this view would be instructive in giving viewers a sense of how the show was compacted.

Attributes about a specific segment may be displayed in the information pane or in pop-up box located in a column beside the respective segment slug. Displayable attribute information could include the length of the segment, the category into which it has been classified or other information regarding the subject matter contained in the segment such as its "rating," or the name of the original program from which the segment came (in the case of a "metamix" of segments).

Other attributes might be more "analog" in their nature with the attribute column displaying the "level" of such qualities. For instance, the attribute column might have symbols representing the level of adult content in each segment (perhaps separate levels for violence, profanity and nudity), or an indication of segments' popularity as measured by frequency of viewing by others ("Hotspots"). Database Description Metadata which describes programs and the segments which make up those programs may be advantageously stored in a relational, hierarchical or object-oriented database, preferably with the ability to accept and deliver data in XML format.

The principal data entity stored describes an instance of a "show;" that is, an entity that defines content that is made available in a specific market, at a specific time, on a specific day. This entity, called a ShowInstance, is a data object from which market data, general show data, and specific segment data can be extracted in order to separate instances for reusability and scaling purposes.

Each ShowInstance specifies its airdate, what market it is in, what show it is, and an ordered list of GSpots (detailed information about a program segment) with start/end times. A Market will be defined by zip code, MSO, and name, as well as potential scheduling information. Generalized Show information consist of the show's name, type, duration, and general synopsis data. A key part of data will be our GSpots. The GSpot will be our detailed breakdown of shows.

The ShowInstance contains an ordered set of GSpots which constitute a playlist for the ShowInstance. Each GSpot will contain detailed information on a segment; that is, on a truncated section of video, type, caption, and rating information all specific to that truncated section.

The database may further hold User Generated information consisting of User contributed GSpots, as well as potential membership information. The user section of the database will grow as the user base expands and uses the system and provides a potential for the gathering of demographic, viewing, and usage data that may be used to identify individual preference data for users as well as aggregate date such a program popularity ratings and "hotspots."

The database may further include Searchable Text data beyond the segment slugs and describers already noted. This text data may include reviews, cast lists, narrative descriptions, close captioned text, and keyword descriptors, all of which may be searched to enable the viewer to search for and identify programming of interest, programming that should be deleted, or programming to be bookmarked to form user-made playlists.

The viewer may be provided with the ability to "sort" or "select" (filter) program segments based on at least selected ones of these attributes by clicking on the attribute label or icon in much the same way a PC email client program user can sort email by date, sender, etc. by simply clicking at the top of the respective column of an email listing. The system may display any number of attributes at a time, and viewers will be able to rotate or scroll through different attribute presentations by clicking their remote.

The Index list visually highlights the segment currently playing, while a highlighter that is moved by using the up-down cursor keys on the remote indicates the segment the viewer is "pointing to" or has "selected" on the list. If the viewer clicks the remote when a listed segment other than the one currently playing is highlighted, the pointed-to segment becomes the segment that is playing.

If a viewer attempts to move the highlighting downwardly from the last segment listed, or upwardly from the first segment listed, while searching for a new segment, the list can simply scroll or can be split into two windows, with one displaying the segment being viewed (and perhaps a few adjacent segments to give the viewer a sense of where the currently playing segment is within a show), while the other windows show lists of segments that are off the screen through which the viewer may wish want to scroll.

The viewer may also be shown a listing of the specific segments within the index that have already been viewed (where "viewing" might be defined as seeing at least 25% of the segment). Partially viewed segments could be visually accented in another way to distinguish them from those that have been fully viewed. This feature would be similar to that feature of email client programs that shows unread emails in bold type while un-bolding the listing of messages once they are read.

The system may create a placeholder or temporary bookmark when a viewer leaves a segment. If the viewer returns to the segment, this bookmark will behave like a new bookmark placed between the beginning and end of that segment. This feature will allow a viewer to surf out of a segment to look for another segment to watch, a different recorded program to peruse, or simply to take a break from viewing. In any case, the viewer will be able to easily return to this point of departure upon returning to the segment by clicking the next segment button. A visual symbol on the index could indicate that a particular segment has a bookmark in it. If the user watches the unviewed portion of the segment, the bookmark would be automatically deleted.

As the index will take up valuable screen space, the viewer will not always want to have it visible. At the same time, the viewer would want to have the ability to skip to the next segment without having to toggle on the index display. Therefore, the remote control should provide a "Next Button" that will skip the playback to the next segment with a simple click without the presence on-screen of the index. In addition, a "Back" button will take the user to the previous segment. The "Next" and "Back" functions would respect the current sort order of a playlist, e.g. a playlist sorted by alphabetical order would have C as the next segment after B.

Holding either button down could have the same effect as it does on the keyboard—resulting in an accelerating rate of skipping. Alternatively, such an action could simultaneously result in the index being displayed again without having to have specifically hit the "view index" button.

Viewers may also able to invoke fast forward and backward while playing a segment. Thus, segment management enables a viewer to make gross movements in the video stream, while fast-forward and reverse move you through the segments in an analog way. A toggle button on the remote may be provided to cycle the viewer through multiple fast-forward (or backward) speeds and then back to normal speed.

The system may also provide a "scan" function that behaves like the scan button on a car radio, which goes from station to station playing a few seconds of audio from each station until the listener makes a choice. In this case, when invoked, the scan button will play a few seconds of video from each listed video segment, moving from choice to choice until a selection is made. This scanning concept can work at both the show-level and segment-level of granularity. Specifically, scanning can be used within a program recorded on a PVR or stored on a VOD server to help the viewer decide which segments are worth watching. The scan feature may also be used for a set of programs that are either stored on a VOD server or recorded to a PVR, scanning through samples of each recorded program to help a viewer select which program to watch.

For either the segment or show-level scanning function the metadata could be generated via:

1. Human editors selecting the appropriate content (done in advance of playback);
2. Automatic markup techniques used instead of or to assist human editors, or at time of playback at the client or server system; or
3. A random content selection means employed at the time of playback under the assumption that any piece of content could be satisfactory.

At the segment level, the scanning function would march down the show index; showing a snippet for each segment and helping the viewer decide if any given segment was worth watching in total. The technique could be used for any playlist generated for a given show or set of shows (a "metamix" playlist). Segment scanning may be performed in one of two ways:

1) A viewer could hit the Scan button and hit a Play button when a segment worth watching was presented. Upon hitting the Play button, the segment would start at the beginning of the segment. Upon completion, the system would need to be reset into scan mode.

2) The Scan button could take the viewer through each segment's snippet and the user could signal which segments were to be watched upon completing the scan. This would in essence, create a playlist of segments to watch. It would have the advantage of ascertaining which of all the segments were worth watching in full before committing the time to watch any one segment in its entirety.

At the program level, the Scan Function is akin to channel surfing (where a viewer watches a small snippet of show before moving on), or alternatively, serves to replace analyzing the EPG to see what is worth watching. When used at the PVR level, the scan function would select a single scene, a few snippets, or an integrated "trailer" to give someone a sense of the program.

Typically, the metadata used for program scanning would use metadata that was different than that used to divide the show into segments, as the index metadata would be too course to allow for the extraction of the short, pithy highlights best suited for this function.

The metadata used in the scanning function, and the resulting video clips extracted, would have to be carefully selected so as not to give away too much of the plot or game result in the case of sports, as discussed later under topic "Plot Leakage."

The content used in either program-level or segment-level scanning could be customized to a specific viewer, client device, or VOD system. This playback could be custom-tailored to each viewer's taste in the following ways:

1. Length of snippets
2. Degree of "plot leakage" allowed

Type of content. For instance, if a viewer liked action sequences, the system could use metadata that would play samples of the action scenes for scanning purposes.

Playlists

An index listing of segments is manifested as a collection of metadata which defines an ordered set of program segments that may be replayed in the order listed in the absence of some intervention by the viewer. Hence, these segment indexes are also termed "Playlists."

In general, as noted earlier, segments have any number of attributes associated with them. These attributes could be the basis for creating playlists, that is, a listing of segments that represents a subset of all the segments or a subset of some existing subset of segments. A "show index" is a playlist of the segments that makeup a broadcast program or "show" with the segments being listed in the order originally broadcast. A user-created playlist may identify segments that may or may not be in a different order than the original broadcast. In addition, the segments in different playlists may have different start and stop times and not be based on any particular segmentation scheme for breaking the show into segments.

Viewers will have the ability to select one or more segments from one or more show indices and create a playlist for later playback. The selection of the segments could be automatic (for instance if a search was performed requesting a list of segments on a specific topic) or manual whereby a viewer would peruse the indices and their attributes for one or more shows and select manually segments to be added to a playlist.

The manual creation process could be assisted by automated techniques. For instance, a football game could be sorted by type of play, and then a user could manually select all the pass catches of interest to create an All-Star playlist. Each playlist could at any time be reordered by the viewer, again on a manual basis, or by sorting on specific attributes (such as date, channel, subject matter, etc.)

To support such manual creation of a list, the system supports a cut-and-paste function. Adding this set of commands (or any other system features) is implemented by adding, or reusing buttons on the remote, adding voice control to the system, or adding more menu choices on-screen.

A dynamic playlist can be discarded after using it or could be permanently stored as a named playlist file for later viewing. Such playlist files can also be sent to other viewer households for use in similar systems.

User-Generated Bookmarks

The system provides means by which viewers can create and delete their own bookmarks. With the appropriate input device, users can write the text of the "slug" description for each bookmarked segment. These bookmarks could either standalone, be written to a separate playlist of bookmarked segments, or they could be incorporated as extra bookmarks in an existing playlist. The bookmarks could be associated with a unique individual within a particular household, either as a guide for a viewer to previously watched material, or as a recommended bookmark or playlist of bookmarks written for another viewer.

Viewers could also manufacture other attributes and associate them with a segment. For instance, a viewer may wish to keep a playlist based on Hotspots (see below) but modify later modify that playlist by including her favorite music video in the list. The system would allow her to insert a new Hotspot rating for that segment. By the same token, attributes such as category classifications for segments could be changed.

Playlist Selection

The viewer interface should offer viewers an easy way to select amongst playlists, perhaps without having to stop the show. Using a button on the remote, a user could toggle between multiple playlists. The system would rotate through the various playlists showing them one at a time to the user.

The video would continue playing based on the original playlist sequence unless the user actually selected a new one. If the user selected a new playlist, segments from the new playlist could start playing immediately at the beginning of the newly selected playlist, or it could start playing off the new list at the same point the old one left off. The system could allow user-generated bookmarks to be represented as a playlist and give users access to these via the same toggle function.

Pre-Made Playlists

A "preview" playlist uses metadata to form a playlist which is the equivalent of a personalized trailer for a stored program, linking together segments of the show video in a seamless fashion. The preview author would take pains to be sure not to spoil the plot. The viewer could set parameters specifying such things as (a) how long previews should be, (b) from how many spots in the show the system could draw samples, (c) how conservative the playlist should be in protecting the plot line, or (d) whether the viewer will accept random samples from shows that weren't expressly tagged for this purpose.

Automatic preview construction may also take into account the content preferences of a viewer. If a viewer really likes action sequences, the focus could be on showing the viewer what action sequences were in a particular show. The system would be able to deduce viewer content preferences over time by monitoring segment-based and program-level viewing. Alternatively, the user could specify such preferences explicitly in their user profile.

Highlights

A "highlights" playlist would focus on summarizing a given program to a shortened version consisting of the highlights of the show. As in the preview playlist, the system could personalize the playlist by viewer or household based on time preferences, and content preferences. As is the case in previews and "favorites" described below, the segment boundaries could be shifted for each type of playlist constructed.

The easiest form of highlighting is that applied to segmentable content. Here the system would tag the best plays in a sports program or funniest jokes in a comedy routine. Using Highlights to shorten linear programming to allow viewers to see the material in less time, while still preserving the plot, would be more challenging for the playlist author.

To provide the viewer with a measure of interactive participation, a visible signal may be displayed on the screen when an upcoming segment is about to be skipped. The user would be able to override the skip at that time or after the skip had occurred by clicking on an icon that would appear before and after the skip.

A text description that would scroll or be presented on the screen in the manner of close-caption text could be used to summarize the missed scenes. Another way to handle the skip would be to present a mini-trailer of the deleted section, flashing mini-snippets to give the viewer the gist of what was missed.

Favorites

A "favorites" playlist would collate all the segments regarding a certain theme or character. Thus, a viewer might wish to see all the scenes from a golf tournament involving Tiger Woods or all the segments related to a soap opera sub-plot.

Hotspots

A "hotspots" playlist would be based on the popularity attribute of each segment. The system would monitor a sample of viewers, preferably similar to the target user, and determine which segments were garnering the greatest interest. This "level of interest" metric is a segment attribute that may be displayed on the screen and the viewer could sort on it.

Personalization by Content

The "preference" playlist presents a subset of content, such as a show or a daily collection of shows, to the viewer based on the content preferences assigned to each viewer, PVR, set-top-box, or household, and the categories assigned to each content segment.

Disk Space Conservation

The system periodically purges older program materials to provide room for new programming. In general, previously stored programs are retained until more space is needed, and then these programs are deleted on a prioritized basis. Programming may be discarded at the request of the viewer, with a warning being issued if the program to be deleted includes one or more segments specified on one or more playlists. Programming which has been viewed and which has not been identified by a bookmark or playlist will be automatically deleted to make additional room. Programming which has not been watched, or tagged to be saved, is discarded on a first-in, first-out basis to make room for new programming.

The memory management mechanism keeps track of relationships between segments. So if one segment duplicates another, only one would be retained, and all playlist references to a duplicate segment to be deleted are replaced with a reference to the retained copy. When duplicate segments exist, the more up-to-date segment is retained and the older duplicate is purged.

PVR viewers could specify that they only want to watch particular shows using certain playlists. In such cases, the system could delete recorded content segments not pertinent to those playlists. For instance, if only baseball highlights were desired, then the hard drive could delete all non-highlighted segments once that metadata was downloaded. This process could be applied to segments with low Hotspot ratings, or those that did not meet content parameters. When the system needs additional space, it may request the user for permission to delete all portions of certain programs except those segments that are referenced on one or more playlists.

EPG Annotation

Many of the functions and features described here with respect to the indexing and playback of segments within a program may be applied to programs or "shows" as a whole. At the "show-level" of granularity, these features and functions may be implemented by modifying and extending the existing EPG mechanism provided by the PVR or programming provider.

A conventional EPG may be annotated in several ways to implement these features and functions. First, the displayed program guide may be annotated to identify locally stored programs in the PVR (or remote first way would be to annotate the EPG in such a manner to disclose which stored slowly stored programs offered as VOD) for which playlists or other metadata is available, and further to identify what kind of playlists or metadata available (e.g., hotspot playlists, highlight playlists, personal preference playlists, etc.).

In addition to identifying stored programs for which metadata was available, the EPG for future programming may be annotated to identify the extent and nature of the metadata which would be available for individual programs, thus potentially assisting viewers in their selection of which programs to record. Note also that the availability of metadata may be used as one of the factors taken into account when the system automatically selects certain programs for recording when empty space is available.

A second form of annotation would show summary data concerning the metadata available for a show. Summary "hotspot" data, for instance, could be used to visually identify, for example by color coding, those programs which were watched only briefly and shows which audience continued to watch for extended periods. These viewing statistics could be compared to past episodes to get a relative measure of a given show's popularity versus other episodes of the same show. Again, for a given viewer, the goal would be to offer collaborative data from a group of viewers whose characteristics matched those of the PVR user.

Another form of EPG annotation could be used to identify programming which matched the viewer's content preferences. For example, the identification of a viewer's favorite actors could be stored as preference data, and when one of the identified actors appears in a particular show, that show could be highlighted on the EPG, and segments in which that actor appeared could be identified in a playlist. For faster-breaking items, an alert that new content of interest has appeared could be displayed on a segment index listing, on the information pane, or on an EPG.

Note that all of these techniques can be applied on both program-level EPGs and on the segment-level segment index listings.

Movie Rating Control

As noted above, attributes may be associated with each segment identified in a show index or other playlist. These attributes may include a ranking for each segment by its level of sex, violence, and profanity.

The advantage of using this technique is that it is entirely under the control of the user. The family editor may use automated filtering to create a playlist guided version of a show which deletes objectionable material, and has the opportunity to review questionable segments and could perhaps leave them if desired. To do this, the Family Editor would have to have the ability to change the rating of segment or disable the offending attribute. This would be done via a simple thumbs-up/down type of one-click action on the remote. Furthermore, the family "suitability reviewer" could use the "Scan" mode to quickly get to the pertinent part of each segment to ascertain its suitability. Finally, the playlist as edited for a given show could be easily saved for later reuse allowing the movie to be filtered at a different time from the playback.

To give viewers a sense of what they missed of plot-importance, if anything, the index listing could be used as a tool to inform. That is, certain segments could be deemed to be important from a plot or characterization standpoint, and the extended slugs or info-boxes for these segments could reflect this information. The video screen would be blank or display a still frame, while viewers would take a few seconds to read about the missing piece.

Note that the use of an edited playlist for providing an expurgated version of a show does not prevent others from watching the show in its entirety. Thus, parents may filter movies for their children, but may watch the same movies in their entirety when their children are not present.

As an alternative, a visual flag may appear when a segment having a defined attribute (such as high violence content) is about to appear, alerting a parent to the possible need to skip the segment manually if it is deemed to be inappropriate for viewing. In this system, when an undesirable segment (as determined by the segment attribute and viewer input as to what constitutes "bad") is about to come on, a visual signal would appear on the screen. There could be an indication as to how long until the undesirable scene was to appear (perhaps a count-down type time bar) and perhaps the length of the adult scene as well.

To this end, different icons could be used to indicate for foul language, nudity, and violence. Images of monkeys with hands over eyes and/or ears could further help guide the parent as to the correct course of action. These visual clues would give the parent time to avert the child's attention before the scene appeared. The adult would continue to be able to watch the entire sequence with minimal distraction from having to monitoring the children's exposure to undesirable content. When the adult content had passed, the icon would leave the screen.

In another form of "Viewing with Parents," the default could be that an adult segment would automatically be skipped unless the system was told otherwise. Under this scenario, a visual cue would tell the adult that a scene was about to be skipped. The adult could read the index information, or decide based on other circumstances to override the setting and have the segment play.

Self made Movie Bookmarks

As described earlier, the system may include means for automatically parsing or "bookmarking" a stored program into segments. The system would also allow users to create their own metadata. Thus, as noted above, a parent could watch a movie first and bookmark out the undesirable scenes. In addition, a viewer could use the self-made bookmark feature to easily get back to favorite scenes. Such a feature would be especially popular with children who like to view the same movies over and over. Note that a user-created bookmark may take the form of additional metadata that appropriately "tags" an already parsed segment in an existing playlist, or an item from an existing playlist may be added to a new, user-created playlist of bookmarks. In addition, the bookmarked item may be parsed (that is, have its beginning and ending times specified) from existing content.

A viewer may transfer playlists such as self-made sets of bookmarks to other viewers, or upload them to a server using the upload facility 250 seen in FIG. 2 where other users could access them. Community-generated bookmarks would clearly be marked as such and by noting the author, so that other users could get a sense of who produced useable markups. Users would be able to rate the value of the markups provided by a given reviewer and provide attributes for the playlist, such as an indication of the playlist's suitability for children of a particular age.

Plot leakage, Dynamic Descriptors and Segment Markers

For information-based shows such as a news program, the labels (slugs and descriptive text) for each segment should be as informative as possible in order to increase the efficiency of the viewer's surfing actions. When displaying the descriptions of segments for a sports event or drama, a problem could develop by exposing the viewer to too much information, giving away the plot, result of a game, etc. This "plot leakage" could be avoided by having an alternative set of segment labels that do not give away the story but still act to inform the viewer to a limited extent about the particular segment, much as the labels on DVD segments do.

Consequently, the system supports labels whose content can dynamically change as the show is watched. For instance, after a portion of a baseball game has been viewed, the labels for the already viewed innings could be changed to be very descriptive. This change would be made under the assumption that the viewer had already seen the content once and that they would only go back to review certain items a second time to see specific highlights or other points of interest. As such, it would be important to label the previously viewed content as well as possible, while keeping the to-be-viewed content labeled in a less-informative manner. The user may affirmatively select informative or generic labels under different circumstances.

In addition, segment markers could change over time. For instance, after the ball game had been viewed through the first three innings, the segment markers for that material might focus on pointing out the highlights of those innings. The pointers for the material that had not been viewed would demarcate the beginning and end of innings, for instance, or other generic boundaries that do not reveal the content of the show.

The Vault

A major benefit of the playlist-based metadata employed by the invention is the ability which is provided to viewers to save a show, or selected segments of a show, in semi-permanent form, and potentially in a manner that varies the saved program itself. This feature allows users to store entire shows, or selected portions of shows, in their own personal virtual library or jukebox for quick, personalized viewing.

A key ease-of-use feature for the Vault would be the "one-button save". When watching a show, a viewer could hit the Save Segment button and the segment currently being viewed would go into the vault (that is, metadata identifying the current segment would be added to stored playlist).

Another feature would allow segments fitting a particular profile to be automatically saved to the Vault. For instance, a soccer fan might set up his system to automatically save any recorded goals to his Vault. In a VOD system, this virtual saving would happen when the new content was added to the server and associated with the respective metadata. There would also be a reference as to the origin of the new material in the Vault.

The use of playlist metadata to identify "saved" segments operates as a "virtual vault," conserving disk space in that copies of the recorded program segment are not normally made. If the memory management mechanism attempts to delete a program containing segments identified in a playlist, all portions of the program except the referenced segments may be deleted. Alternatively, the memory management system may automatically and transparently copy referenced segments into a separate file and alter the playlist(s) to refer to the segments in the new file, making the original program file or files eligible for deletion. In the case of a VOD system, playlists for individual viewers may be stored at the server providing the content, or may be saved locally at the PVR, in which case the metadata includes references to segments as stored on the VOD server.

Note that playlists may organized into personal "folders" which may be password protected so that they can be accessed only by their owners, or playlists may be placed in a common area could be accessible by anybody.

Further, playlists may be organized into content based folders, such as Sports, News, Comedy, Music, etc. that may be pre-defined or constructed by the viewer. When a playlist (which may consist of only a single segment) is saved, it would be assigned to one of these specific storage areas. Note also that both folders can be nested, and the user may request the sequential playback of the contents of a folder. Thus, folders may be treated as a playlist of nested playlists. By way of example, a viewer might request the playback of a folder of "music videos" which contains a folder of "Jazz" videos as well as playlists for individual music videos. The sorting, filtering and editing tools described above for playlists may be used to organize the content of folders, and derive new folders from existing folders.

The Vault may also support copying portions of programs to permanent storage, i.e. DVD or CDR. For instance, this feature could support a user copying an MTV music video onto a DVD for a permanent collection. Any metadata associated with the segments could be transferred to the DVD as well, particularly any segment markers as they could allow the users to use the DVD controls to surf through the content on the DVD. Business rules, digital rights management, and payment systems could be associated via metadata to the content allowing or disallowing such functions.

Preferential Segment Recording

Conserving disk space on the PVR or nPVR (network PVR) is a concern to both users and MSOs. One way to conserve disk space is to record only certain parts of a show by informing the PVR or nPVR ahead of time specifically what to record or what not to record. An alternative mechanism which achieves similar results by using metadata to trim the unwanted portions after a recording. The 'trimming' process may be accomplished in at least two ways: by editing the recording to delete the unwanted portions leaving just the desired segments and by making a new copy of the recording but with just the wanted portion of the video and then delete the original. In both cases, the metadata associated with the wanted segments would be used to identify the portions to be 'trimmed.' This process may be automatically invoked upon completion of recording or manually processed with the user selecting individual segments to delete or keep. In addition, it could be possible to have the system automatically 'trim' certain pieces of a recording based on a user's viewing history and personal preferences.

Business Rule Support

One or "business rules" may be associated with a folder, a playlist or an individual segment within a playlist. For example, a content provider may set up two or more classes of service, such as 'paid' and 'non-paid.' The 'paid' subscriber would have access to metadata identifying advertising and be permitted to manually or automatically watch commercial free TV. The 'non-paid' subscriber would not have access to these marks and have no automated way to avoid commercials. As a second example, a provider might offer playlists which provide condensed highlights of a sports event only to premium subscribers.

These implementations allow for the creation of one piece of content that can be delivered as two separate services. In the above example, NBC could create one episode of Friends which could then be could be viewed differently by two classes of service.

Digital Rights Management

Digital rights management is a concern to operators and content owners alike. As users adopt DVR technologies to take more control of their own viewing habits, content owners need new ways to maintain control of their content. By using metadata to specify business rule attributes for folders, playlists and/or individual segments, different rules can be applied to different content. For instance, some music videos recorded from MTV could be saved indefinitely while others may have specific expiration dates. Similarly, one video may have unlimited playing capability while another has a defined limit, e.g. after 10 plays the user can opt to pay for additional viewing rights or let the content expire. Thus, each segment or group of segments can be associated with attributes that specify the rights a user or class of users has with respect to that content.

Payment Systems

Business rule attributes provide a mechanism for providing additional revenue opportunities to content providers by allowing users to purchase special rights for a show or parts of a show. Similar to the sale of individual songs via the Internet, the system may permit a user to buy the right to play a copy of a music video or how-to video which has been recorded on the PVR. Moreover, a user could create their own DVD or CD-R by buying the rights to copy to a permanent archive or a permanently saved portion of the PVR hard drive, a segment from a temporal PVR recording which was previously tagged for limited viewing only. Information in the content's metadata, such as price or SKU, could be used to conduct the commerce transaction which could be conducted at a Web site having a URL identified in the metadata.

Metadata Distribution

The metadata download facility, seen at 240 in FIG. 2, like any real time data feed, is necessarily limited by network latency, network bandwidth, and/or limited peak processing capability. Consequently, impairments in the reliability and timeliness of metadata could become a crippling issue for the service. By supporting two distribution methods, metadata delivery can be adjusted to match the actual end-to-end capacities of the system thereby increasing the services' performance and overall reliability.

The two methods of distribution may be used: rolling and batch. Using rolling distribution, each segment's metadata is transmitted upon creation rather than waiting for the entire playlist to be completed before sending. Batch distribution occurs when transmission is delayed until a playlist is complete with all its tags, when it is transmitted by a post broadcast. Each component of the communications link, both server and client, are designed to support both distribution models. The decision to use the rolling or batch method can occur in both the tagging station and the back-end servers.

A configurable "blocking factor" parameter associated with the rolling model specifies the number of tags to group before sending. There are two primary factors that influence the value of this parameter: the amount of time desired between tag creation and arrival at the PVR, and the amount of bandwidth available for metadata transmission. A very small blocking factor (such as one) would yield a substantially constant flow of very small data packets, delivering close to real-time metadata, and would have an extremely low total bandwidth requirement. A large blocking factor would result in larger packet sizes, delivering in seconds to minutes, and have higher peak bandwidth requirements. Because each MSO has unique network architecture issues and different uses for the metadata, this parameter can be configured separately for each destination. In applications where the metadata is delivered by a "dialup" connection, the batch method may be used to collect playlists for transmission when periodic connections are established. The rolling model is much preferred, however, and works well with data carousels commonly used in the cable operator's system. Because the data content of metadata is extremely small compared to the content, typically on the order of 5 kilobytes for each hour of content, the transmission of metadata does not add significant burden to broadband system, and may be transmitted separately on a narrow band system.

Note that the rolling distribution model may be hidden or exposed to the viewer. Using a configuration variable, the end device could collect rolling 'tags' and display a given playlist index to the user only upon receiving the final 'tag' for a show indicating to the system that the playlist is complete, or may be displayed immediately when the user is watching and recording live TV, providing a guide to the prior recorded portion in the event the user wishes to replay portions even before the program (and the associated playlist) have been completely received.

Rule-based Formatting

To cost effectively create metadata, playlists are created by the metadata service and then distributed via facilities provided by many MSOs as indicated at 240 in FIG. 2. In general, this is an extremely efficient way to create metadata; however, there may be circumstances where slight modifications to the playlist(s) may be required to fit the needs of individual distribution channels. In an NPVR (Network Personal Video Recorder) environment, for instance, each MSO may have different rights to a particular program. One MSO could have the right to offer a baseball game with a complete, play-by-play index while another only has the right to basic navigation, i.e. inning-by-inning level of detail. Thus, although the content is common across the viewing universe, the metadata made available to different groups varies.

Since it would not be economical to produce different playlists (or sets of usable metadata) for each MSO using a human-operated tagging station, a server-based set of rules could programmatically format the playlist tailored to the rights or needs of the MSO. Accordingly, a 'master' playlist, where the 'master' is considered the most complete, is produced first, and then customized playlists are generated from it by simply removing metadata that's not needed. As additional playlists are distributed, they may be processed by the same script controlled conversion program from the master copy of each new playlist.

This approach has at least two key benefits: it becomes economically feasible to offer customized playlists to each destination, and it minimizes the amount of data that needs to be stored by only having to store a script for each MSO rather than multiple playlists for each show.

Scalable Metadata Distribution

One of the major challenges in operating a real-time metadata service of the type contemplated by the present invention is the efficient, scalable and timely distribution of the metadata itself. With tens of thousands of cable head ends, and with each head end having several different channel mappings, it is particularly desirable to minimize the amount of metadata transmitted.

To this end, the largest and most frequently distributed collections of metadata are normalized prior to distribution. Playlist metadata files are normalized to increase efficiency with the least amount of complexity. This is accomplished by requiring each destination or distribution node to have a small bit of intelligence which employs a configuration file to map the metadata to its local channel configuration. The configuration file distributed to end devices is called a Media Guide (MG). In addition to describing to a client device how to retrieve the metadata file (i.e. what the file name is), the Media Guide also informs the client device which upcoming programs will have associated metadata.

Using the Media Guide, a provider or client device may modify its EPG to include indicators telling users ahead of time which programs will have metadata available for them. The Media Guide itself includes cable head end identifiers and local channel numbers which, coupled with program broadcast times, are then mapped to a single unique identifier for a program. This unique identifier is then used as the file name for the metadata file containing normalized playlists for distribution.

Segment-Based Content Management

Video-on-demand (VOD) vendors today are looking at ways to use peer-to-peer (P2P) networking technology and Akamai-like caching of content to more efficiently push content to the edge of the digital cable network. More popular offerings are cached at the system nodes as opposed to further upstream at headends (similar to the Akamai model) in order to minimize bandwidth needs and latency. P2P techniques are being developed to allow headends and nodes to share content with each other to minimize storage and bandwidth requirements in a manner similar to the popular Napster music sharing system.

In accordance with one aspect of the present invention, a segment-based technology can bring a similar benefit to the cable VOD world. In this model, each show is segmented into logical pieces with segment data coming from proprietary indexing services, content producers, the viewing community, or via automation tools of the type described in the above-identified patent applications. With the availability of segment breaks and labels, viewers will have the ability to surf and peruse these video segments as they would text; that is, watching some full segments, some parts of others, and skipping some segments entirely.

Data regarding this viewing behavior is garnered in several ways. Historical data can be used to deduce that program introductions are viewed the most, for instance. Human editors or the content producers themselves could estimate segment usage after watching the content themselves. But better still, segment-based viewing data can be automatically generated to indicate statistically how often each piece is actually being viewed. Using actual data provides a model in which the usage data improves over time as more people view the content. Of course, multiple models could be used with hypothetical data being used at first and then being supplemented with empirical data as it became available.

With segment viewing data, the most popular segments of shows can be cached at the edge of the networks or made available for sharing by other nodes and hubs. In this way, bandwidth and storage resources, and latency reduction, get optimized at the show or program level and not on a program-by-program basis.

As viewers gain experience with new capabilities (that is, watching highlights, previews, condensed versions of shows, etc.), viewing habits will change and content segments will start to fall into categories that are seen often and those that are seen less frequently. Currently, without intelligent navigation to guide users to the parts they really want, consumers use time-shifting navigation less then they will in the future because the only means now available to most viewers is the fast-forward button. With the advent of easy-to-use time shifting and program navigation controls, there will be less need for traditional program guides because original broadcast times and channels matter less and less. The new program guide will accordingly provide more and better content information (content summaries, previews, shortened versions) and the guides will organize this information based on subject matter rather than by time and channel. The segmentation of programs facilitates the delivery and organization of program content as described in the above-identified applications and in the description which follows.

To optimize this architecture, the system might not always store content segments exactly as defined by specific bookmarks. For instance, it might be beneficial if each section stored on the edge of the network had a few seconds of extra material from the next segment appended to it. That would allow viewers to finish one segment, begin the next, and skip to another without having the system have to present the whole intermediate, but unwanted, segment that was skipped. If the viewers got past a "trigger point" in the appended material, that would signal the system to "download" the rest of the segment.

In an alternative embodiment, the edge network might store the beginnings of each segment only. If the user viewed past a certain threshold portion of any segment, the system would take that as a sign that the whole segment was to be watched and the rest of the segment would then be fetched.

To best implement such a system, means should be provided to splice individual segments together in a seamless fashion. Existing video stream splicing techniques for this (some patented by ACTV) are currently used in inserting ads into video streams in a video stream, and could be employed for this new purpose.

Reducing Storage Requirements

If storage costs are relatively more expensive than bandwidth costs, the system should be constructed in a way to minimize the number of copies or variants stored for each program. One technique for reducing the total number of copies stored is to store more material further upstream in the network from which a single copy can be shared by more than one subscriber location.

By using metadata to identify and describe individual segments, a single copy of the material to be used for multiple purposes, further minimizing the amount of redundant content in the network. For instance, a preview could be constructed from the existing material by using metadata to form a playlist of segments that could comprise a preview, a shortened version of the program, a version with the ratings changed (e.g. an alternative version with profanity eliminated), or a highlight version that would just focus on one character.

The segment-based architecture provides an improved mechanism for purging content from storage which is less likely to be requested soon again. Currently, the PVRs manufactured by Tivo and ReplayTV use various algorithms for deleting complete programs based on age, perceived utility to the viewer, and other conflicts. Using a segment-based scheme, these algorithms could be more sophisticated. For instance, if space were needed, the first step might be to shrink down the program to a condensed version predefined by metadata. As a further example, if a viewer only watches MTV Hot Spots, then only these would be saved. In other words, instead of just making a binary decision to delete or not, shades of gray could be offered by deleting part of a show. Another method of "partially deleting a show" would be to re-encode in a lower quality, or with a reduced picture size, or with color converted to black and white.

Increased Processing Performance

Segment-based viewing can significantly increase processor performance. In today's VOD systems, trick play (fast forward, rewind, and pause) is offered and used quite often. This trick play consumes significant processing power. Each time it is invoked, the system has to start playing from a sped-up file constructed for such purpose, or construct one on the fly by pulling I-frames out of the MPEG stream. Further computational efforts must be made to make the transition back to the original file for normal play once the new location for playback has been identified.

With segment-bases viewing, this processor load is lightened appreciably as viewers can easily be moved across the original video file. With a segmented file, users can get from segment to segment in one of two ways: by reading the index of segments that is presented and choosing to jump to one, or by starting to view the next segment, deciding not to watch it, and then hitting the "next" button, bringing up the next segment in the playlist currently playing.

With segment-based viewing using these modes of skipping segments, there will be much less use of trick play as a form of navigation. Viewers will merely click to get to the next segment or place to sample content. With segment markers, each "stop" in the playlist made is positioned to better delimit programming based on content, so that fewer but more intelligent moves are made.

"Ways to Watch" Television in VOD and PVR Systems

As described here, and in the related patent applications identified above, a number of new "Ways to Watch" television are described, playlist modes such as Previews, Hot Spots, Condensed Version, Highlights, Personalized Versions, etc. These Ways to Watch can be used to advantage in both VOD and PVR systems.

In subscription-based VOD services, these Ways to Watch may be offered selectively to subscribers as extra-cost options. A second business-model concept is to use Previews (auto-generated or based on Hot Spot real time ratings of segments) to induce people to buy specific shows.

These new Ways to Watch are preferably implemented using segmentation. It is important to note that a segment may be different for different playlist types. For instance, constructing a Condensed Version playlist benefits from first identifying new, smaller segments that are better suited to construct a summary. In a similar fashion, even smaller segments might be needed to make a Preview. Thus, for both VOD and PVR systems, the playlist metadata used to specify the segments making up different presentations may refer to same program content segmented in different ways.

One of the useful new Ways to Watch television, "Hot Spots," is preferably implemented using playlist metadata to identify segments which are deemed to be "popular." Here it should be noted that there are two ways to think about them—as measures of popularity relative to other segments within a show, or a more absolute measure which looks at a segment's popularity relative to segments in all shows or a group of shows. To measure the relative "intra-show" popularity of a segment, for instance, actual program viewing data would be processed to identify those segments which were most frequently watched. Heuristics may be constructed for each measurement to properly weight partial viewings. Users should be given the option of using either intra-show Hot Spot or global Hot Spot measurements.

Since Hot Spots will be found most useful when they are based on actual viewing data from a group of viewers with whom the subscriber shares certain viewing habits and interests, the process of Hot Spot selection may advantageously employ collaborative filtering.

It should further be noted that, in assessing the popularity of a given segment, it is important to take into account the order in which that is watched. Thus, if there were a group of like-minded viewer with whom a subscriber shares bookmarks and Hot Spots, the subscriber might also want to share the order in which you viewed these segments as well. For example, a subscriber might send a playlist of music videos to watch. If the recipient merely watched the identified Hot Spots in some arbitrary order (such as the order in which the segments were recorded), the experience which the sender intended would not be reproduced Presence and Interacting with Other Viewers In addition to Hot Spot metadata created from monitored viewing habit and explicit ratings submitted on segments, a mechanism may be employed to provide "awareness-based communication" in the context of particular programs. The system tells a viewer "where the crowds are" and a viewer can then use that information to preferentially access the identified content. This effectively creates a feedback effect in that, to the extent that more people flock to a show, the more people will watch the show. Thus, the Hot Spot mechanism could indicate to a viewer how many people (perhaps within a given circle of friends and acquaintances) are watching what segment of a given show at any time. This mechanism might could even allow someone to catch up to the crowd or to a friend. That is, someone could use the metadata to skim through a show to catch up to the portion being watched by a friend or a group, and then engage in a live chat with another person about the show at that point. In this way, once a subscriber "joins the crowd," she can interact with those fellow viewers now understanding which segment they are viewing. This could be done by visually associating each viewer with a segment in the index.

Because multiple people may be watching the same show at different times, it would be advantageous to offer time-shifted or asynchronous communication between viewers. That is, comments, ratings, and other communications about a show could be saved and time-shifted. In addition, they could be sorted by associated segment.

The communication could be with known parties such as friends and relatives, or with strangers. For friends, these comments could be organized by originator and accessed as such. The comments could be stored at the headend, or for greater privacy, they could be stored on the originator's machine. In the latter case, other viewers would only be notified of where to go to get the metadata. For strangers, a mechanism maybe be provided whereby viewers would rate the commentators. The comments from all previous episodes would be saved for later access. As time on, users of the metadata would rate it and sort it out so the best metadata rose to the surface for greatest use. In either model, viewers may review the metadata first, and use that as the "linkage" to access the content itself. That is they might find a glowing review about a piece of content and click on the appropriate link to get the content itself, as discussed further below.

In another form of presence-based communication, the system could allow a viewer to "pull a viewer" into a viewing experience by "Instant Messaging" the person. This communication could perhaps be based on a profile or preference and key off of the context of where you were in the show—i.e., a use of segment-based metadata. Historical data with regards to who watched the show last time could be used to "corral" the right people this time into seeing the show you have pulled down from the VOD server.

To facilitate finding out who to communicate with (among friends), the subscriber should be able to inspect into their viewing file to see if they have seen the show before. Users could also share viewing histories to request information about specific episodes. In PVR systems, this mechanism may be extended to cover being able to preview, and perhaps modify, what they are about to record.

Metamixing: Inter-show Segment Compilations

The segment-based system contemplated by the invention permits users to mix content across different shows creating in essence new "virtual shows". Content could be pulled from any number of sources—different VOD systems, a PVR, or off the Internet. The process of combining the content pieces would be done using supplied metadata. For instance, a user can select attributes (sport, team, company, character, actor, artist/singer, category) and have the system automatically and dynamically assemble content for viewing.

Additionally, if the VOD system knows what is stored locally, regionally, or nationally and its "availability", the system can filter for the viewer currently available or efficiently accessible content.

The metadata should describe the segments in enough detail such that redundancies could be avoided. In addition, the user or the system would need to provide bounds on the length of the composite show desired. The composite itself would have bookmarks, and be surfable, and contain information indicating the popularity of specific segments.

Ads Personalized by Segment Content

Based on the segment currently being viewed, advertising segments could be dynamically pulled from a database that would be personalized by the type of content that surrounded the ad as defined by the metadata schema. Currently ads for a normal broadcast might be inserted based on the surrounding contents (for example, advertising for snow tires inserted in the weather report). In addition, advertising may be inserted into the viewing stream based on the personal traits of the viewer. As contemplated by the present invention, ad placement can be a function of both the surrounding context and the identity of the viewer.

Automated Reviews

When a viewer has paused a movie and wants to pick up back where he or she left off at a later time, the system may automatically generate highlights of the previously viewed segments to get the viewer back up to speed with the content. The viewer can choose to skip over the review, or easily surf through it, if desired and in either case continue to watch the program from the point from which they originally left off.

Note, as mentioned above, the segments presented that would constitute the review are not necessarily the same segments that were used for other purposes and playlist. It would be ideal to use segments specifically tailored to the idea of reminding people what they had already seen. (In the case of Previews, for instance, those segments are specifically designed so as to not give away the plot, which is the opposite of the effect desired from a condensed review which is to serve as a reminder.

Automated Teasers

When a user has finished viewing a program the system will automatically compile and play a list of segments associated with highlights from programs that relate to the one just viewed. The intention would be to grab the user's attention and induce him or her to invest more time in the same type of content while they are still in the viewing process. This is similar to broadcasters' "coming up next week" gambit.

In the same vein, after viewing a show, the system may prompt the user to "Recommend this show to a friend" by clicking on a button.

Sharing Content

Segment-based VOD systems offer some unique opportunities for controlling content sharing. For instance, content owners could assent to certain segments being shared with viewers outside the subscriber universe. This would allow someone to email a segment to another person who is not a subscriber with the permission of the content holder. This form of sharing could benefit the content holder as it would stimulate demand for the whole work in the same way that a radio station's play of a single song stimulates sales of the entire CD.

Other business rules could be applied such as a limit on how many different segments a viewer could send, which segments are send-able, a limit on how many could be sent to a given recipient, or how long or many times the segments could be viewed once received, etc.

As with the sharing of bookmarks, discussed below, the sharing can be done over an email system tied to the VOD system, via Instant Messaging, or other similar forms of communication.

Sharing Bookmarks

Within a VOD community of subscribers to the same content, segment metadata offers the opportunity to share bookmarks in a manner similar to the way in which PVR users share bookmarks. In a VOD system, however, it is no longer is hit or miss as to whether the recipient has the content to which the bookmarks apply—as everybody will have access to the same VOD content. (In the PVR case, both parties must record the same content for the sharing to be effective.) In a situation where everybody has access to the same content, the utility of receiving bookmarks from a trusted source is much higher.

Shared bookmarks can be either generated by the system or they can be bookmarks generated by a viewer. The bookmark would have a "link" to the content, so that merely clicking on the link would "bring up" the appropriate program to view.

Library of Metadata and Bookmarks

Viewers could compile their own a library of bookmarks and metadata. This can consist of user-generated metadata, system-generated metadata, or metadata received from other viewers. Users can add and delete entries as desired.

The metadata could be sorted and viewed in various fashions. "Links" may be provided to take the viewer from the metadata to the content stored on the VOD system.

Whenever a viewer accesses content in the VOD system, it may automatically check the user's library of metadata to see if there are any self-generated or received bookmarks with which the content could be synchronized.

An alternative version of the library of metadata would be to have the system provide a library of metadata that would function as an EPG. This metadata would consist of subjective metadata such as commentaries, reviews, Hot Spots, as well, factual data such as segment labels, etc. Viewers could access the metadata and use the built-in links to access the actual content. Alternatively, this metadata could be combined with a normal EPG to get the best of both worlds.

The Bookmark Library as a "Previously-Viewed" EPG

While users will be able to create their own bookmarks, they will also be able annotate the entire show in various ways. These annotations could include comments about a show (if a keyboard or voice input system is available) or simple ratings. This show-based metadata, as well as, any segment-based metadata, would be stored in a user-accessible database.

The purpose of this database would be to maintain a running log of shows the user has viewed—perhaps both good and bad. With this database easily accessible, a user could access their history of viewing by title, rating, metadata information, channel, date, or any other field in the database.

To simplify the database, items could be deleted, either by algorithm ("don't store newscasts in the database") or manually, a step that could convert the database into a collection of favorites watched.

Segments or shows can be accessed in this manner. Once a show has been identified, the viewer could click on it and invoke the related content. In this way, the library of bookmarks and database of metadata becomes an EPG to previously viewed content. This would be handy when trying to re-watch a previously viewed show, to just review the highlights of such a show, to point out segments to another viewer you are watching TV with, or to retrieve metadata for sharing.

Personal VOD Vaults

As described earlier, a PVR may operate as a "vault" in which the user can save segments from shows. In much the same way, a mechanism can be provided to enable users to "save" segments stored on the headend PVR (Networked PVR). VOD headend storage is subtlety different from PVR storage. The PVR Personal Vault is more focused around segments and requires the user to purposefully put things in it. The VOD headend personal storage may be thought of as a Previously Viewed EPG, that is, a viewing diary that is somewhat more show-based, and would not necessarily need a segmentation schema to work.

In this model, a viewer can choose to 'save' segments, either pre-defined or delineated by user-generated bookmarks, which have the effect of storing the content in their own "personal storage locker" at the headend. This storage really represents a shared right to the content stored on the cable company's PVR.

These rights could vary. For instance, they could be for a pre-defined period of time based or number of viewings. There could be limits based on how much could be saved and what can be saved given the viewer's subscription level. Specific purchases might be required to view specific pieces of content. In other cases, "saved" segments might be able to be shared with others. This sharing could either be done by exporting the content itself outside the VOD system, or merely by sending someone the bookmarks describing the content's location (in much the same way that either a URL can be sent or an actual web page when sharing web content).

The act of storing also makes the content available in specific ways, i.e., through the playlist manager of the Gotuit TV System.

The VOD vendor can store copies of the material in a way that optimizes bandwidth and storage costs based on the rights people might have to any piece of content. In one example, only a few segments out of a show might be saved. The different types of vaults can be private, regional, or community-based and integrated with the VOD server conditional access system.

Conclusion

It is to be understood that the specific methods and apparatus that have been described are merely illustrative applications of the principles of the present invention. Numerous modifications may be made to the processes and mechanisms described without departing from the true spirit and scope of the invention.

What is claimed is:

1. A method for selectively displaying video programming, comprising the steps of:
   automatically generating metadata that delimits a start and an end of each video program segment in a set of video program segments within at least one video programming sequence, wherein each video program segment is associated with an access key, each access key operable to identify the video program segment and corresponding metadata, wherein the access key comprises a uniform resource locator;
   incorporating manual adjustments to the start and end of at least one of the video program segments;
   accessing, over a network, additional manual adjustments to the start and end of the at least one of the video program segments;
   in response to a determination that the additional manual adjustments create an improved version of the at least one of the video program segments, updating the metadata of the at least one of the video program segments to include the additional manual adjustments;
   reproducing the set of segments on a display device in an ordered sequence specified by a playlist, in the absence of an intervening control command from a viewer;
   displaying a segment guide listing on the display device, the segment guide listing containing, for each segment of the set, a text description corresponding to the respective segment, with the text description corresponding to the segment currently being reproduced being visually identified on said guide listing;
   receiving an indication that the viewer has selected a text description of the segment guide listing, the selected text description describing a desired segment of the set of segments; and
   retrieving the desired segment using segment identification information corresponding to the desired segment for reproducing on the display device the desired segment.

2. The method of claim 1 wherein the metadata further identifies contents of each video program segment.

3. The method of claim 1 wherein the metadata delimits the start and the end of each video program segment using markers specifying byte offsets in the at least one video programming sequence.

4. The method of claim 1 wherein the metadata delimits the start and the end of each video program segment using markers specifying a time position relative to a reference time associated with the at least one video programming sequence.

5. The method of claim 1 wherein the metadata specifies signatures of the at least one video programming sequence, the signatures identifying signal characteristics of the at least one video programming sequence to establish delimiting markers for each video program segment.

6. The method of claim 1 wherein the metadata delimits the start and the end of each video program segment based on a one or more user profiles indicating the viewing habits of one or more users.

7. The method of claim 1, wherein incorporating manual adjustments to the start and end of at least one of the video program segments comprises:
   incorporating first manual adjustments to the start and end of a video portion of the at least one of the video program segments;
   incorporating second manual adjustments to the start and end of an audio portion of the at least one of the video program segments, wherein the first and second manual adjustments result in the video portion being a different length than the audio portion; and
   further modifying content of the at least one of the video program segments so that the video portion and the audio portion have the same length.

8. The method of claim 7, wherein further modifying content of the at least one of the video program segments so that the video portion and the audio portion have the same length comprises lengthening the video portion by performing an action selected from a group consisting of:
   adding filler content to the video portion;
   adding one or more freeze-frame displays to the video portion; and
   altering at least a part of the video portion to be in slow motion.

9. An apparatus for selectively displaying video programming, comprising:
   a metadata generator for automatically generating metadata that delimits a start and an end of each video program segment in a set of video program segments within at least one video programming sequence, wherein each video program segment is associated with an access key, each access key operable to identify the video program segment and corresponding metadata, wherein the access key comprises a uniform resource locator, the metadata generator further for:
   incorporating manual adjustments to the start and end of at least one of the video program segments;
   accessing, over a network, additional manual adjustments to the start and end of the at least one of the video program segments; and
   in response to a determination that the additional manual adjustments create an improved version of the at least one of the video program segments, updating the metadata of the at least one of the video program segments to include the additional manual adjustments;
   a display for reproducing the set of segments in an ordered sequence specified by a playlist, in the absence of an intervening control command from a viewer;
   the display further operable to display a segment guide listing, the segment guide listing containing, for each segment of the set, a text description corresponding to the respective segment, with the text description corresponding to the segment currently being reproduced being visually identified on said guide listing;

an interface for receiving an indication that the viewer has selected a text description of the segment guide listing, the selected text description describing a desired segment of the set of segments; and a processor for retrieving the desired segment using segment identification information corresponding to the desired segment for reproducing on the display device the desired segment.

10. The apparatus of claim 9 wherein the metadata further identifies contents of each video program segment.

11. The apparatus of claim 9 wherein the metadata delimits the start and the end of each video program segment using markers specifying byte offsets in the at least one video programming sequence.

12. The apparatus of claim 9 wherein the metadata delimits the start and the end of each video program segment using markers specifying a time position relative to a reference time associated with the at least one video programming sequence.

13. The apparatus of claim 9 wherein the metadata specifies signatures of the at least one video programming sequence, the signatures identifying signal characteristics of the at least one video programming sequence to establish delimiting markers for each video program segment.

14. The apparatus of claim 9 wherein the metadata delimits the start and the end of each video program segment based on a one or more user profiles indicating the viewing habits of one or more users.

15. The apparatus of claim 9, wherein the metadata generator further for incorporating manual adjustments to the start and end of at least one of the video program segments comprises the metadata generator further for:
incorporating first manual adjustments to the start and end of a video portion of the at least one of the video program segments;
incorporating second manual adjustments to the start and end of an audio portion of the at least one of the video program segments, wherein the first and second manual adjustments result in the video portion being a different length than the audio portion; and
further modifying content of the at least one of the video program segments so that the video portion and the audio portion have the same length.

16. The apparatus of claim 15, wherein the metadata generator further for further modifying content of the at least one of the video program segments so that the video portion and the audio portion have the same length comprises the metadata generator further for lengthening the video portion by performing an action selected from a group consisting of:
adding filler content to the video portion;
adding one or more freeze-frame displays to the video portion; and
altering at least a part of the video portion to be in slow motion.

17. A method for selectively displaying video programming, comprising the steps of:
automatically generating metadata that delimits a start and an end of each video program segment in a set of video program segments within at least one video programming sequence, wherein each video program segment is associated with an access key, each access key operable to identify the video program segment and corresponding metadata, wherein the access key comprises a uniform resource locator;
incorporating manual adjustments to the start and end of at least one of the video program segments by:
incorporating first manual adjustments to the start and end of a video portion of the at least one of the video program segments;
incorporating second manual adjustments to the start and end of an audio portion of the at least one of the video program segments, wherein the first and second manual adjustments result in the video portion being a different length than the audio portion; and
further modifying content of the at least one of the video program segments so that the video portion and the audio portion have the same length;
reproducing the set of segments on a display device in an ordered sequence specified by a playlist, in the absence of an intervening control command from a viewer;
displaying a segment guide listing on the display device, the segment guide listing containing, for each segment of the set, a text description corresponding to the respective segment, with the text description corresponding to the segment currently being reproduced being visually identified on said guide listing;
receiving an indication that the viewer has selected a text description of the segment guide listing, the selected text description describing a desired segment of the set of segments; and
retrieving the desired segment using segment identification information corresponding to the desired segment for reproducing on the display device the desired segment.

* * * * *